(12) United States Patent
Zigoris et al.

(10) Patent No.: US 9,742,822 B2
(45) Date of Patent: *Aug. 22, 2017

(54) SPONSORED STORIES UNIT CREATION FROM ORGANIC ACTIVITY STREAM

(71) Applicant: Facebook, Inc., Menlo Park, CA (US)

(72) Inventors: Philip Anastasios Zigoris, San Francisco, CA (US); Nipun Mathur, Menlo Park, CA (US); Robert Kang-Xing Jin, Palo Alto, CA (US); Brian Thomas Boland, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/792,528

(22) Filed: Jul. 6, 2015

(65) Prior Publication Data

US 2015/0312292 A1    Oct. 29, 2015

Related U.S. Application Data

(63) Continuation of application No. 13/327,557, filed on Dec. 15, 2011, now Pat. No. 9,123,079, which is a
(Continued)

(51) Int. Cl.
*G06F 15/16* (2006.01)
*H04L 29/06* (2006.01)
(Continued)

(52) U.S. Cl.
CPC ...... *H04L 65/403* (2013.01); *G06F 17/30867* (2013.01); *G06Q 50/01* (2013.01); *H04L 67/22* (2013.01)

(58) Field of Classification Search
CPC ... H04L 12/588; H04L 51/32; H04L 12/1859; H04L 12/5855; H04L 63/00; H04L 65/1083; H04L 65/4084
See application file for complete search history.

(56) References Cited

U.S. PATENT DOCUMENTS 5,987,440 A    11/1999    O'Neil et al.
6,134,532 A    10/2000    Lazarus et al.
(Continued)

FOREIGN PATENT DOCUMENTS

CA    2 672 735    6/2008
JP    2002-092408 A    3/2002
(Continued)

OTHER PUBLICATIONS

Anonymous, "HTTP cookie," Wikipedia, the free encyclopedia, Oct. 2007, XP002680841, sixteen pages. [Online] [Retrieved Jul. 26, 2012] Retrieved from the Internet <URL:http://en.wikipedia.org/w/index.php?title=HTTP_cookie&oldid=168063574.>.

(Continued)

*Primary Examiner* — Arvin Eskandarnia
*Assistant Examiner* — Thao Duong
(74) *Attorney, Agent, or Firm* — Fenwick & West LLP

(57) ABSTRACT

Methods, apparatuses and systems directed to sponsored story generation from an organic activity stream in a social networking site. A user wishing to promote an entry from an organic activity stream may, using a sponsor user interface, specify the types of stories to promote to a portion of the home page displayed to a member of a social network.

20 Claims, 11 Drawing Sheets

Related U.S. Application Data continuation-in-part of application No. 12/193,702, filed on Aug. 18, 2008, now Pat. No. 8,799,068.

(60) Provisional application No. 60/985,631, filed on Nov. 5, 2007.

(51) Int. Cl.
    *G06Q 50/00*         (2012.01)
    *G06F 17/30*         (2006.01)
    *H04L 29/08*         (2006.01)

(56) References Cited

U.S. PATENT DOCUMENTS

| | | |
|---|---|---|
| 6,691,155 B2 | 2/2004 | Gottfried |
| 7,752,552 B2 | 7/2010 | Pennington et al. |
| 7,853,622 B1 | 12/2010 | Baluja et al. |
| 8,892,650 B2 | 11/2014 | Li et al. |
| 9,135,631 B2 | 9/2015 | Mitchell et al. |
| 2002/0029186 A1 | 3/2002 | Roth et al. |
| 2002/0070961 A1 | 6/2002 | Xu et al. |
| 2002/0087352 A1 | 7/2002 | Armstrong et al. |
| 2002/0161838 A1 | 10/2002 | Pickover et al. |
| 2002/0184088 A1 | 12/2002 | Rosenberg |
| 2003/0046161 A1 | 3/2003 | Kamangar et al. |
| 2003/0137531 A1 | 7/2003 | Katinsky et al. |
| 2003/0149580 A1 | 8/2003 | Moores et al. |
| 2003/0163372 A1 | 8/2003 | Kolsy |
| 2003/0187739 A1 | 10/2003 | Powers |
| 2004/0015397 A1 | 1/2004 | Barry et al. |
| 2004/0193691 A1 | 9/2004 | Chang |
| 2004/0210565 A1 | 10/2004 | Lu et al. |
| 2005/0065806 A1 | 3/2005 | Harik |
| 2005/0096980 A1 | 5/2005 | Koningstein |
| 2005/0097204 A1 | 5/2005 | Horowitz et al. |
| 2005/0131992 A1 | 6/2005 | Goldstein et al. |
| 2005/0137958 A1 | 6/2005 | Huber et al. |
| 2005/0144065 A1 | 6/2005 | Calabria et al. |
| 2005/0149397 A1 | 7/2005 | Morgenstern et al. |
| 2005/0171955 A1 | 8/2005 | Hull et al. |
| 2005/0216300 A1 | 9/2005 | Appelman et al. |
| 2005/0246651 A1 | 11/2005 | Krzanowski |
| 2005/0289131 A1 | 12/2005 | Aenlle et al. |
| 2006/0042483 A1 | 3/2006 | Work et al. |
| 2006/0059147 A1 | 3/2006 | Weiss et al. |
| 2006/0064346 A1 | 3/2006 | Steenstra et al. |
| 2006/0085408 A1 | 4/2006 | Morsa |
| 2006/0101341 A1 | 5/2006 | Kelly et al. |
| 2006/0248573 A1 | 11/2006 | Pannu et al. |
| 2006/0271953 A1* | 11/2006 | Jacoby .................. H04N 7/173 725/34 |
| 2007/0016553 A1 | 1/2007 | Dumais et al. |
| 2007/0043766 A1 | 2/2007 | Nicholas et al. |
| 2007/0073581 A1 | 3/2007 | Kempe et al. |
| 2007/0121843 A1 | 5/2007 | Atazky et al. |
| 2007/0150537 A1 | 6/2007 | Graham |
| 2007/0150603 A1 | 6/2007 | Crull et al. |
| 2007/0157108 A1 | 7/2007 | Bishop |
| 2007/0179792 A1 | 8/2007 | Kramer |
| 2007/0220575 A1 | 9/2007 | Cooper et al. |
| 2007/0239517 A1 | 10/2007 | Chung et al. |
| 2007/0239535 A1 | 10/2007 | Koran et al. |
| 2007/0252004 A1 | 11/2007 | Shiraki et al. |
| 2007/0260520 A1* | 11/2007 | Jha .................. G06Q 30/02 705/14.44 |
| 2007/0265090 A1 | 11/2007 | Barsness et al. |
| 2007/0266097 A1 | 11/2007 | Harik et al. |
| 2007/0299857 A1 | 12/2007 | Gworzdz et al. |
| 2007/0300064 A1 | 12/2007 | Isaacs et al. |
| 2008/0004959 A1 | 1/2008 | Tunguz-Zawislak et al. |
| 2008/0010144 A1 | 1/2008 | Chatwin et al. |
| 2008/0021729 A1 | 1/2008 | Calabria |
| 2008/0040475 A1 | 2/2008 | Bosworth et al. |
| 2008/0040673 A1 | 2/2008 | Zuckerberg et al. |
| 2008/0059308 A1 | 3/2008 | Gerken |
| 2008/0065405 A1 | 3/2008 | Adelman et al. |
| 2008/0065486 A1 | 3/2008 | Vincent et al. |
| 2008/0070209 A1 | 3/2008 | Zhuang et al. |
| 2008/0082413 A1 | 4/2008 | Madhavan |
| 2008/0082414 A1 | 4/2008 | Madhavan |
| 2008/0086319 A1 | 4/2008 | Berger |
| 2008/0091684 A1* | 4/2008 | Ellis .................. G06F 17/30011 |
| 2008/0103913 A1 | 5/2008 | Leach et al. |
| 2008/0104225 A1 | 5/2008 | Zhang et al. |
| 2008/0109285 A1 | 5/2008 | Reuther et al. |
| 2008/0126476 A1 | 5/2008 | Nicholas et al. |
| 2008/0126949 A1 | 5/2008 | Sharma |
| 2008/0133364 A1 | 6/2008 | Ullah |
| 2008/0133756 A1 | 6/2008 | Taylor |
| 2008/0147498 A1 | 6/2008 | Chao et al. |
| 2008/0147659 A1 | 6/2008 | Chen et al. |
| 2008/0162260 A1 | 7/2008 | Rohan et al. |
| 2008/0177708 A1 | 7/2008 | Ayyar et al. |
| 2008/0189169 A1 | 8/2008 | Turpin et al. |
| 2008/0195428 A1 | 8/2008 | O'Sullivan |
| 2008/0215581 A1 | 9/2008 | Messing et al. |
| 2008/0228537 A1 | 9/2008 | Monfried et al. |
| 2008/0250450 A1 | 10/2008 | Larner et al. |
| 2008/0270615 A1 | 10/2008 | Centola et al. |
| 2008/0275899 A1 | 11/2008 | Baluja et al. |
| 2008/0276183 A1 | 11/2008 | Siegrist et al. |
| 2008/0281622 A1 | 11/2008 | Hoal |
| 2008/0294624 A1 | 11/2008 | Kanigsberg et al. |
| 2009/0006206 A1 | 1/2009 | Groe et al. |
| 2009/0006469 A1 | 1/2009 | Jain et al. |
| 2009/0018915 A1 | 1/2009 | Fisse |
| 2009/0037255 A1 | 2/2009 | Chiu et al. |
| 2009/0037257 A1 | 2/2009 | Stuckey et al. |
| 2009/0043648 A1 | 2/2009 | Mahdian et al. |
| 2009/0055257 A1 | 2/2009 | Chien et al. |
| 2009/0055263 A1 | 2/2009 | Okubo et al. |
| 2009/0055285 A1 | 2/2009 | Law et al. |
| 2009/0063284 A1 | 3/2009 | Turpin et al. |
| 2009/0063467 A1 | 3/2009 | Abhyanker |
| 2009/0070219 A1 | 3/2009 | D'Angelo et al. |
| 2009/0070334 A1 | 3/2009 | Callahan et al. |
| 2009/0070684 A1 | 3/2009 | Aldrich et al. |
| 2009/0083134 A1 | 3/2009 | Burckart et al. |
| 2009/0099909 A1 | 4/2009 | Phan |
| 2009/0106040 A1 | 4/2009 | Jones |
| 2009/0106085 A1 | 4/2009 | Raimbeault |
| 2009/0106113 A1 | 4/2009 | Arora et al. |
| 2009/0106447 A1 | 4/2009 | Lection |
| 2009/0112701 A1 | 4/2009 | Turpin et al. |
| 2009/0113480 A1 | 4/2009 | Allard et al. |
| 2009/0119167 A1 | 5/2009 | Kendall et al. |
| 2009/0171748 A1 | 7/2009 | Aven et al. |
| 2009/0182589 A1 | 7/2009 | Kendall et al. |
| 2009/0187486 A1 | 7/2009 | Lefenfeld et al. |
| 2009/0271247 A1 | 10/2009 | Karelin et al. |
| 2009/0292656 A1 | 11/2009 | Raman et al. |
| 2010/0010822 A1 | 1/2010 | Bal et al. |
| 2010/0023871 A1 | 1/2010 | Bederson et al. |
| 2010/0057536 A1 | 3/2010 | Stefik et al. |
| 2010/0063892 A1 | 3/2010 | Keronen et al. |
| 2010/0070335 A1 | 3/2010 | Parekh et al. |
| 2010/0153212 A1 | 6/2010 | Stoll |
| 2010/0174593 A1 | 7/2010 | Cao et al. |
| 2010/0174726 A1 | 7/2010 | Nance et al. |
| 2010/0185513 A1 | 7/2010 | Anderson et al. |
| 2010/0217645 A1 | 8/2010 | Jin et al. |
| 2010/0223119 A1 | 9/2010 | Klish |
| 2010/0228582 A1 | 9/2010 | King et al. |
| 2010/0228614 A1 | 9/2010 | Zhang et al. |
| 2010/0228617 A1 | 9/2010 | Ransom et al. |
| 2010/0293054 A1 | 11/2010 | Lieberman |
| 2010/0293221 A1 | 11/2010 | Sidman et al. |
| 2011/0010448 A1 | 1/2011 | Gill et al. |
| 2011/0029388 A1 | 2/2011 | Kendall et al. |
| 2011/0040586 A1 | 2/2011 | Murray et al. |
| 2011/0040629 A1 | 2/2011 | Chiu et al. |
| 2011/0041168 A1 | 2/2011 | Murray et al. |
| 2011/0078228 A1 | 3/2011 | Bristol et al. |

(56) References Cited

U.S. PATENT DOCUMENTS

| | | |
|---|---|---|
| 2011/0093336 A1 | 4/2011 | Calabria |
| 2011/0154203 A1 | 6/2011 | Spencer et al. |
| 2011/0161419 A1 | 6/2011 | Chunilal |
| 2011/0208582 A1 | 8/2011 | Hoyle |
| 2011/0264499 A1 | 10/2011 | Abendroth et al. |
| 2011/0264535 A1 | 10/2011 | Lee et al. |
| 2011/0276396 A1 | 11/2011 | Rathod |
| 2011/0282972 A1 | 11/2011 | Rosen |
| 2011/0320274 A1 | 12/2011 | Patil |
| 2012/0072428 A1 | 3/2012 | Kao et al. |
| 2012/0095836 A1 | 4/2012 | Kendall et al. |
| 2012/0101898 A1 | 4/2012 | Kendall et al. |
| 2012/0109757 A1 | 5/2012 | Kendall et al. |
| 2012/0110080 A1 | 5/2012 | Panyam et al. |
| 2012/0151359 A1 | 6/2012 | Mysen et al. |
| 2012/0158501 A1 | 6/2012 | Zhang et al. |
| 2012/0203831 A1 | 8/2012 | Schoen et al. |
| 2012/0203847 A1 | 8/2012 | Kendall et al. |
| 2012/0204096 A1 | 8/2012 | Kendall et al. |
| 2012/0208512 A1 | 8/2012 | Maharajh et al. |
| 2012/0233009 A1 | 9/2012 | Fougner et al. |
| 2012/0239750 A1 | 9/2012 | Schoen et al. |
| 2012/0246232 A1 | 9/2012 | Schoen et al. |
| 2013/0014030 A1 | 1/2013 | Schoen et al. |
| 2013/0024250 A1 | 1/2013 | Wu et al. |
| 2013/0073983 A1 | 3/2013 | Rasmussen et al. |
| 2013/0198008 A1 | 8/2013 | Kendall et al. |
| 2013/0297702 A1 | 11/2013 | Schoen et al. |
| 2014/0108965 A1 | 4/2014 | Schoen et al. |
| 2014/0115500 A1 | 4/2014 | Schoen et al. |
| 2014/0122249 A1 | 5/2014 | Schoen et al. |
| 2014/0123034 A1 | 5/2014 | Schoen et al. |
| 2014/0040042 A1 | 10/2014 | Schoen et al. |
| 2014/0337142 A1 | 11/2014 | Li et al. |

FOREIGN PATENT DOCUMENTS

| | | |
|---|---|---|
| JP | 2004-192166 A | 7/2004 |
| JP | 2007-206876 | 8/2007 |
| JP | 2007-241558 | 9/2007 |
| JP | 2007-241894 | 9/2007 |
| JP | 2010-063114 | 3/2010 |
| KR | 10-2011-0032878 A | 3/2011 |
| WO | WO 2009/061616 A1 | 5/2009 |
| WO | WO 2011/078975 A1 | 6/2011 |
| WO | WO 2012/082318 A1 | 6/2012 |

OTHER PUBLICATIONS

Canadian Intellectual Property Office, Office Action, Canadian Patent Application No. 2,704,680, Jul. 25, 2012, two pages.
Canadian Intellectual Property Office, Office Action, Canadian Patent Application No. 2,704,680, Sep. 13, 2013, two pages.
Canadian Intellectual Property Office, Office Action, Canadian Patent Application No. 2,704,680, Jun. 8, 2015, three pages.
Canadian Intellectual Property Office, Office Action, Canadian Patent Application No. 2,825,760, Jan. 16, 2014, five pages.
Mexican Institute of Industrial Property, Office Action, Mexican Patent Application No. MX/a/2013/008792, Mar. 17, 2015, four pages.
PCT International Search Report and Written Opinion, PCT Application No. PCT/US2008/080789, Dec. 12, 2008, seven pages.
PCT International Search Report and Written Opinion, PCT Application No. PCT/US2011/061545, Mar. 27, 2012, six pages.
PCT International Search Report and Written Opinion, PCT Application No. PCT/US2012/023631, Sep. 10, 2012, six pages.
PCT International Search Report and Written Opinion, PCT Application No. PCT/US2011/049076, Apr. 27, 2012, six pages.
PCT International Search Report and Written Opinion, PCT Application No. PCT/US2013/043189, Aug. 28, 2013, eleven pages.
U.S. Office Action, U.S. Appl. No. 12/193,702, Aug. 18, 2010, forty-nine pages.
U.S. Office Action, U.S. Appl. No. 12/193,702, Dec. 22, 2010, forty-eight pages.
U.S. Office Action, U.S. Appl. No. 12/193,702, Jan. 23, 2012, forty pages.
U.S. Office Action, U.S. Appl. No. 12/193,702, Jul. 25, 2011, forty-two pages.
U.S. Office Action, U.S. Appl. No. 12/193,702, Sep. 23, 2013, fifty-seven pages.
U.S. Office Action, U.S. Appl. No. 12/853,241, Apr. 22, 2013, thirty-nine pages.
U.S. Office Action, U.S. Appl. No. 12/853,241, Aug. 18, 2014, thirty-two pages.
U.S. Office Action, U.S. Appl. No. 12/853,241, May 22, 2012, thirty-one pages.
U.S. Office Action, U.S. Appl. No. 12/853,241, Nov. 20, 2013, forty pages.
U.S. Office Action, U.S. Appl. No. 12/853,241, Nov. 20, 2014, nine pages.
U.S. Office Action, U.S. Appl. No. 12/968,786, Aug. 14, 2013, nine pages.
U.S. Office Action, U.S. Appl. No. 12/968,786, Dec. 21, 2012, eleven pages.
U.S. Office Action, U.S. Appl. No. 13/327,557, Feb. 21, 2014, seventeen pages.
U.S. Office Action, U.S. Appl. No. 13/327,557, Jun. 4, 2014, twenty-two pages.
U.S. Office Action, U.S. Appl. No. 13/327,557, May 10, 2013, nineteen pages.
U.S. Office Action, U.S. Appl. No. 13/338,190, Mar. 27, 2012, fifty-two pages.
U.S. Office Action, U.S. Appl. No. 13/338,190, Sep. 6, 2012, eighty-four pages.
U.S. Office Action, U.S. Appl. No. 13/342,003, Apr. 5, 2013, fifty-six pages.
U.S. Office Action, U.S. Appl. No. 13/342,003, Dec. 12, 2012, thirty-four pages.
U.S. Office Action, U.S. Appl. No. 13/342,003, Sep. 25, 2013, forty pages.
U.S. Office Action, U.S. Appl. No. 13/342,006, May 8, 2012, sixty-three pages.
U.S. Office Action, U.S. Appl. No. 13/447,100, Apr. 24, 2013, thirty-five pages.
U.S. Office Action, U.S. Appl. No. 13/447,100, Aug. 14, 2013, forty-six pages.
U.S. Office Action, U.S. Appl. No. 13/447,100, Jul. 27, 2012, thirty-three pages.
U.S. Office Action, U.S. Appl. No. 13/447,100, Nov. 14, 2012, thirty-five pages.
U.S. Office Action, U.S. Appl. No. 13/447,102, Aug. 15, 2014, thirty-five pages.
U.S. Office Action, U.S. Appl. No. 13/447,102, Jun. 1, 2012, sixty-two pages.
U.S. Office Action, U.S. Appl. No. 13/447,102, Nov. 29, 2012, sixty pages.
U.S. Office Action, U.S. Appl. No. 13/447,102, Nov. 21, 2014, ten pages.
U.S. Office Action, U.S. Appl. No. 13/488,275, Sep. 4, 2012, ten pages.
U.S. Office Action, U.S. Appl. No. 13/488,596, Sep. 18, 2012, ten pages.
U.S. Office Action, U.S. Appl. No. 13/619,894, Jan. 7, 2013, seven pages.
U.S. Office Action, U.S. Appl. No. 13/619,894, Sep. 24, 2013, four pages.
U.S. Office Action, U.S. Appl. No. 13/804,150, Feb. 21, 2014, fifty-five pages.
U.S. Office Action, U.S. Appl. No. 13/804,150, Jul. 22, 2014, twenty-four pages.
U.S. Office Action, U.S. Appl. No. 13/804,150, Nov. 25, 2014, fourteen pages.
U.S. Office Action, U.S. Appl. No. 13/938,139, Oct. 23, 2014, ten pages.

(56) References Cited

OTHER PUBLICATIONS

U.S. Office Action, U.S. Appl. No. 14/048,034, Dec. 6, 2013, seven pages.
U.S. Office Action, U.S. Appl. No. 14/137,820, Nov. 5, 2014, five pages.
U.S. Office Action, U.S. Appl. No. 14/340,360, Oct. 6, 2014, seven pages.
U.S. Appl. No. 60/981,781, filed Oct. 22, 2007, Inventors: Gill et al. [copy not enclosed].
United States Office Action, U.S. Appl. No. 14/137,825, Jul. 29, 2016, six pages.
United States Office Action, U.S. Appl. No. 14/137,825, Feb. 16, 2017, ten pages.
United States Office Action, U.S. Appl. No. 14/137,829, Sep. 26, 2016, seven pages.
Australian Government, IP Australia, Patent Examination Report No. 1, Australian Patent Application No. 2012212117, Nov. 17, 2015, four pages.
United States Office Action, U.S. Appl. No. 14/137,825, Feb. 9, 2016, twelve pages.
United States Office Action, U.S. Appl. No. 14/137,834, Apr. 12, 2016, eleven pages.

\* cited by examiner

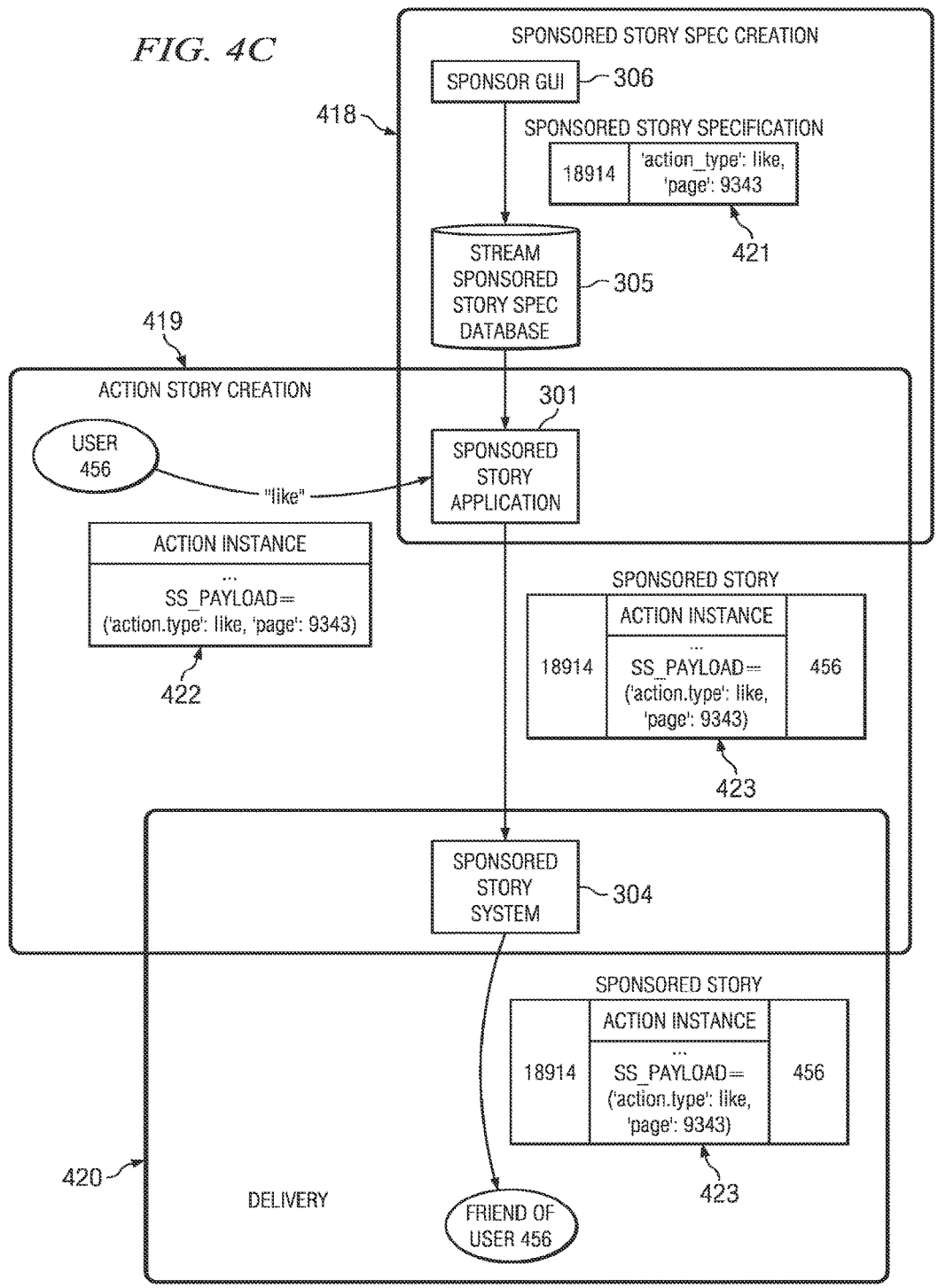

SPONSORED STORIES UNIT CREATION FROM ORGANIC ACTIVITY STREAM

RELATED APPLICATIONS

This application is a continuation of U.S. patent application Ser. No. 13/327,557, filed Dec. 15, 2011, now allowed, which is a continuation-in-part of U.S. patent application Ser. No. 12/193,702, filed Aug. 18, 2008, now U.S. Pat. No. 8,799,068, issued Aug. 5, 2014, which claims the benefit of U.S. provisional patent application 60/985,631, filed Nov. 5, 2007, the contents of which are incorporated herein in their entirety.

This disclosure also hereby incorporates by reference commonly-owned U.S. Utility patent application Ser. No. 13/020,745, entitled "Sponsored Unit Creation from Organic Activity Stream," filed on Feb. 3, 2011; commonly-owned. U.S. Utility patent application Ser. No. 13/044,506, entitled "Endorsement Subscriptions for Sponsored Stories," filed on Mar. 9, 2011; and commonly-owned U.S. Utility patent application Ser. No. 13/212,356, entitled "Computer-Vision Detection for Sponsored Stories," filed on Aug. 18, 2011.

BRIEF DESCRIPTION OF THE DRAWINGS

FIG. 4C illustrates the creation of the sponsored story specification, creation of the sponsored story, and distribution of the boosted sponsored story in three phases.

Figure 1:
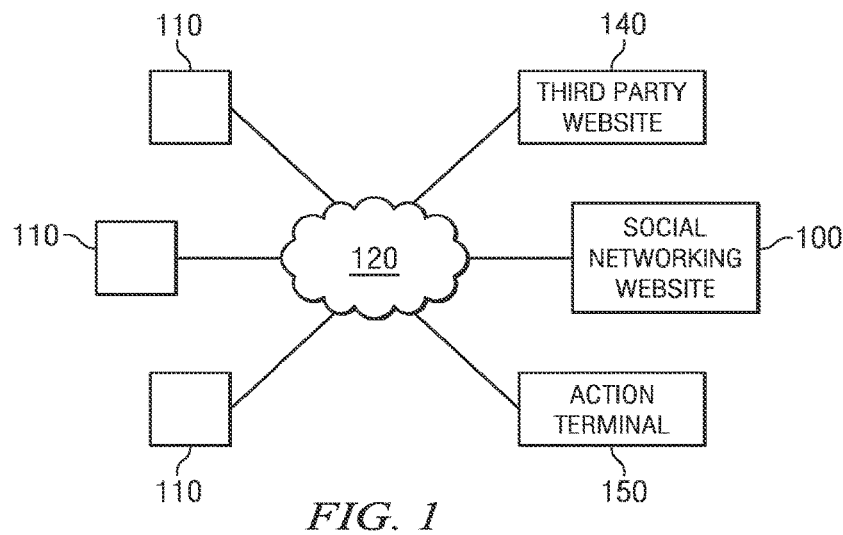
FIG. 1 illustrates the architecture of an example social network.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION OF EXAMPLE EMBODIMENT(S)

Overview

Social networks, or social utilities that track and enable connections between users (including people, businesses, and other entities), have become prevalent in recent years. In particular, social networking websites allow users to communicate information more efficiently. For example, a user may post contact information, background information, job information, hobbies, and/or other user-specific data to a location associated with the user on a social networking website. Other users can then review the posted data by browsing user profiles or searching for profiles including specific data. Social networking websites also allow users to associate themselves with other users, thus creating a web of connections among the users of social networking website. These connections among the users can be leveraged by the website to offer more relevant information to each user in view of the users' own stated interests in their connections.

A system, such as a website, that allows users to interact with the system typically stores a record for each users of the system. These records may comprise information provided by the user as well as information gathered by the system related to activities or actions of the user on the system. For example, a system may require a user to enter information such as contact information, gender, preferences, interests, and the like in an initial interaction with the system, which is stored in the user's record. A user's activities on the system, such as frequency of access of particular information on the system, also provide information that can be stored in the user's record. The system may then use information provided by the user and information gathered about the user, to customize interactions of the system with the user. For example, a website selling books may keep track of a users previous purchases and provide the user with information on related books during subsequent interactions with the system. Information in a user's profile may also be used by the system to target sponsored stories that are of interest to the user. Using information collected from and about users results in a system that is more efficient and beneficial for both the user and the system.

Users interacting with the social network may post stories or status updates to a live activity stream, such as a "news feed." A news feed is a data format typically used for providing users with frequently updated content. A social networking system may provide various news feeds to its users, where each news feed includes content relating to a specific subject matter or topic, and/or other users. Various pieces of content may be aggregated into a single news feed. In some implementations, a social networking system may provide a news feed that includes selected entries corresponding to activities of a user's first-degree contacts and/or pages or topics that a user has indicated an interest. Individual users of the social networking system may subscribe to specific news feeds of their interest. A group of related actions may be presented together to a user of the social networking system in the same news feed. For example, a news feed concerning the event organized through the social networking system may include information about the event, such as its time, location, and attendees, and photos taken at the event, which have been uploaded to the social networking system.

Generally, news feeds are customized for each member; only the status updates and stories posted by their connections are displayed. In this manner, members of the social network may quickly access their direct connections' status updates, story postings, and other interactions with the social network in a single stream, obviating the need to individually check their connections' profile pages.

However, given the vast number of contacts the average member of a social network has, and the prodigious amounts of status updates posted by users, it is possible that stories of interest to the user are lost in the unending stream of their newsfeed. Furthermore, sponsors may wish to pay for permanence of a particular story in members' newsfeeds. This functionality unavailable in typical social networking systems.

Sponsored or promoted stories are generated from actual stories in users' newsfeeds and promoted to a specific area of the user's web browser when viewing the social networking website. Sponsored stories are more likely to be viewed by users, because they generally involve interactions or suggestions by their connected friends, or fan pages that they are connected or subscribed to. Sponsored stories may additionally utilize computer vision algorithms to detect products in uploaded images or photos lacking an explicit connection to the sponsor on the social networking system.

In particular embodiments, any user of the social networking system may generate sponsored stories, even if they do not administer the object or node that is the subject of the sponsored story. In particular embodiments, the sponsor may designate particular objects/nodes and actions on the object/node, to boost to a sponsored story area In particular embodiments, the objects, object instances, or actions may be customized in the social graph by the node administrator, In particular embodiments, the node administrator may define a set of permissions that permit sponsoring a portion or all of its objects or object instances, or for all or a portion of actions on those objects/object instances.

Particular embodiments relate to a social networking environment including a social networking system and related systems that integrate individual stories, status updates, and user interactions with an advertising system. A social networking system offers its users the ability to communicate and interact with other users of the social networking system. Users join the social networking system and then add connections to a number of other users to whom they desire to be connected. Once they are members of the social network, the users may interact with the social network itself, by posting stories and status messages on their own page, other users, by commenting, posting stories, etc. on other users' pages, or with non-user entities, such as fan pages that they subscribe to, online deals they redeem or subscribe to, or locations that they check in to.

Implementations of the present disclosure extend these concepts by allowing sponsors or specific users to export by promoting specific newsfeed stories to sponsored story space on users' social networking pages, thereby increasing the permanence and viewing frequency of these stories. In one example, a user may want to promote one of his news stories so that more of his connected friends can see the story in a more frequent and permanent view. For example, a sponsor who publishes an application, such as a social networking game, may wish for status updates generated with its application to have permanence on the application user's friends' homepages. In another example, a sponsor associated with a page on the social network, may want to promote news stories when a user connects to the page on the social network or to an object associated with the sponsor off network. In another example, the proprietor of a store may wish to promote news stories to a user's friends when that user "checks-in", or indicates that he physically visited, the store. In another example, the proprietor of a store may wish to promote news stories to a user's friends when that user subscribes, purchase, or redeems a deal or coupon associated with the sponsor. Other embodiments are readily envisioned by the disclosure and are described in detail below, FIG. 1 is a high-level block diagram illustrating a system environment suitable for operation of a social networking website 100. The system environment comprises one or more client devices 110, one or more third-party websites 140, a social networking website 100, and a network 120. In alternative configurations, different and/or additional modules can be included in the system.

Client devices 110 comprise one or more computing devices that can receive member input and can transmit and receive data via network 120. For example, client devices 110 may be desktop computers, laptop computers, smart phones, personal digital assistants (PDAs), or any other device including computing functionality and data communication capabilities. Client devices 120 are configured to communicate via network 120, which may comprise any combination of local area and/or wide area networks, using both wired and wireless communication systems. Third party website 140 and action terminal 150 are coupled to network 120 for communicating messages to social networking website 100 about the members' actions off website 100.

Social networking website 100 comprises a computing system that allows members to communicate or otherwise interact with each other and access content as described herein. Social networking website 100 stores member profiles that describe the members of a social network, including biographic, demographic, and other types of descriptive information, such as work experience, educational history, hobbies or preferences, location, and the like. Website 100 further stores data describing one or more relationships between different members. The relationship information may indicate members who have similar or common work experience, group memberships, hobbies, or educational history. Additionally, the social network host site 120 includes member-defined relationships between different members, allowing members to specify their relationships with other members. For example, these member-defined relationships allow members to generate relationships with other members that parallel the members' real-life relationships, such as friends, co-workers, partners, and so forth. Members may select from predefined types of relationships, or define their own relationship types as needed.

A social network system may maintain social graph information, which can generally model the relationships among groups of individuals, and may include relationships ranging from casual acquaintances to close familial bonds. In particular embodiments, nodes representing members, businesses, places, or products on a social network may be connected by various types of interdependency or relationships. Each member of a social network is represented as a node, and each connection between two members is represented as an edge linking the two corresponding nodes. Edges represent a particular interaction between two nodes, such as when a user expresses an interest in a news article shared by another user about a particular topic. The social graph may record interactions between users of the social networking system as well as interactions between users and objects of the social networking system by storing information in the nodes and edges that represent these interactions.

Custom graph object types and graph action types may be defined by third-party developers as well as administrators of the social networking system to define attributes of the graph objects and graph actions. For example, a graph object for a movie may have several defined object properties, such as a title, actors, directors, producers, year, and the like. A graph action, such as "purchase," may be used by a third-party developer on a website external to the social networking system to report custom actions performed by users of the social networking system. In this way, the social graph may be "open," enabling third-party developers to create and use the custom graph objects and actions on external websites.

In particular embodiments, nodes may represent any entity on the social network. For example, a concept node may exist for a broad generalized concept, such as "basketball." As another example, a store or chain of stores may be represented by a node on the social network, such as "Sports Authority." Even more particularly, every single product sold may be represented as a node on the social network; a node may exist for "Nike Air Zoom Kobe IV" shoes. In particular embodiments, third-parties may create object types, such as, for example, "recipes" that may be interacted with via custom actions, such as "cooked" or "saved." In particular embodiments, instances of objects, such as particular recipes in the previous example, may be created by third parties.

In particular embodiments, third-parties may create actions for nodes or objects that they do not administer. For example, third-party developer OpenTable may create an action "make reservation" on nodes representing restaurants. In such an embodiment, when a user performs a search for a particular restaurant, the social networking system may include all action calls on the node. In particular embodiments, the node or object administrator may control the actions that may be performed on his or her nodes.

Third-party developers may enable users of the social networking system to express interest in web pages hosted on websites external to the social networking system. These web pages may be represented as page objects in the social networking system as a result of embedding a widget, a social plugin, programmable logic or code snippet into the web pages, such as an iFrame. Any concept that can be embodied in a web page may become a node in the social graph on the social networking system in this manner. As a result, users may interact with many objects external to the social networking system that are relevant to a keyword or keyword phrase, such as "Justin Timberlake." Each of the interactions with object may be recorded by the social networking system as edges. Enabling third-party developers to define custom object types and custom action types is described further in "Structured Objects and Actions on a Social Networking System," U.S. application Ser. No. 13/249,344 filed on 21 Sep. 2011, which is hereby incorporated by reference.

In particular embodiments, the social networking system may integrate with third party websites via an application programming interface or script calls to the social networking system servers, In particular embodiments, third party websites may query the social graph using a specialized set of graph protocol functions for any information relating to a particular user, such as which of the user's first-degree connections have also visited third party website. In particular embodiments, third party websites may submit information regarding a particular user's purchases or browsing history, and the social networking system may dynamically generate object nodes for the products purchased, or, in particular embodiments, the pages visited. For example, if a user visits page containing a news article and clicks a "share" or "like" widget that communicates with the social networking system, the social networking system may determine whether an object node already exists for the article, and, if not, dynamically create an object node for the article and connect the user node to the object node with a "share" or "like" edge, This disclosure contemplates responding to any type of query to the social graph, and importing any type of object information into the social graph.

Figure 2:
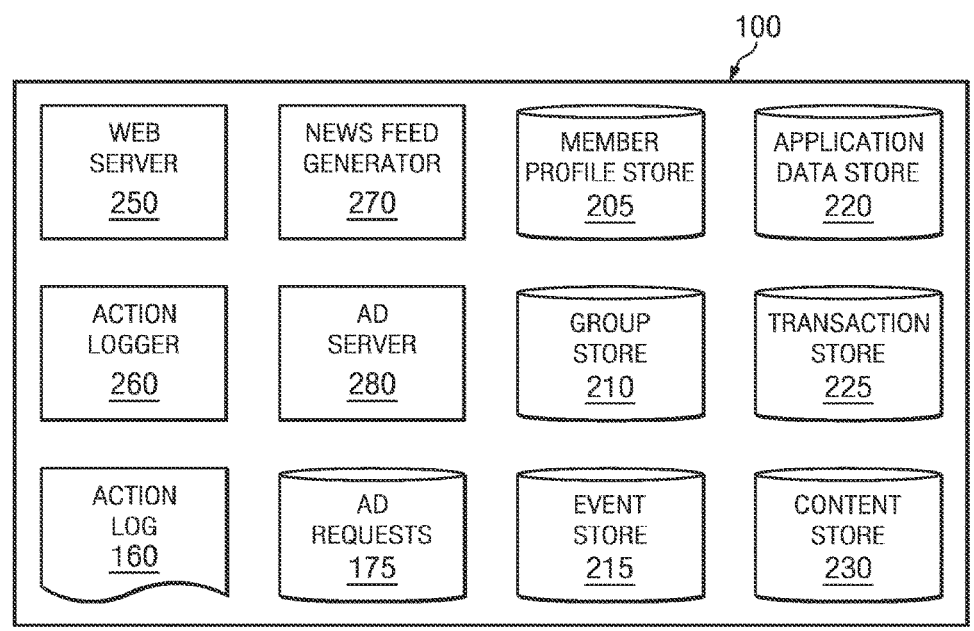
FIG. 2 illustrates the hardware components of an example social network.

FIG. 2 is an example block diagram of a social networking website 100. Social networking website 100 includes a web server 250, an action logger 260, an action log 160, a newsfeed generator 270, an ad server 280, a database of ad requests 175, a member profile store 205, a group store 210, an event store 215, an application data store 220, a transaction store 245, and a content store 230. In other embodiments, social networking website 100 may include additional, fewer, or different modules for various applications.

Web server 250 links social networking website 100 via network 220 to one or more client devices 210, as well as to one or more third party websites 140. Web server 250 may include a mail server or other messaging functionality for receiving and routing messages between social networking website 100 and client devices 210 or third party websites 140. The messages can be instant messages, queued messages (e.g., email), text and SMS messages, or any other suitable messaging technique.

Action logger 260 is capable of receiving communications from the web server 250 about member actions on and/or off social networking website 100. Newsfeed generator 270 generates communications for each member about information that may be relevant to the member. These communications may take the form of stories, each story is an information message comprising one or a few lines of information about an action in the action log that is relevant to the particular member. The stories are presented to a member via one or more pages of the social networking website 100, for example in each member's home page or newsfeed page.

Ad server 280 performs an ad selection algorithm 170. Ad server 280 is communicatively coupled to the database of ad requests 175 and to action log 160 for this purpose.

Figure 3A:
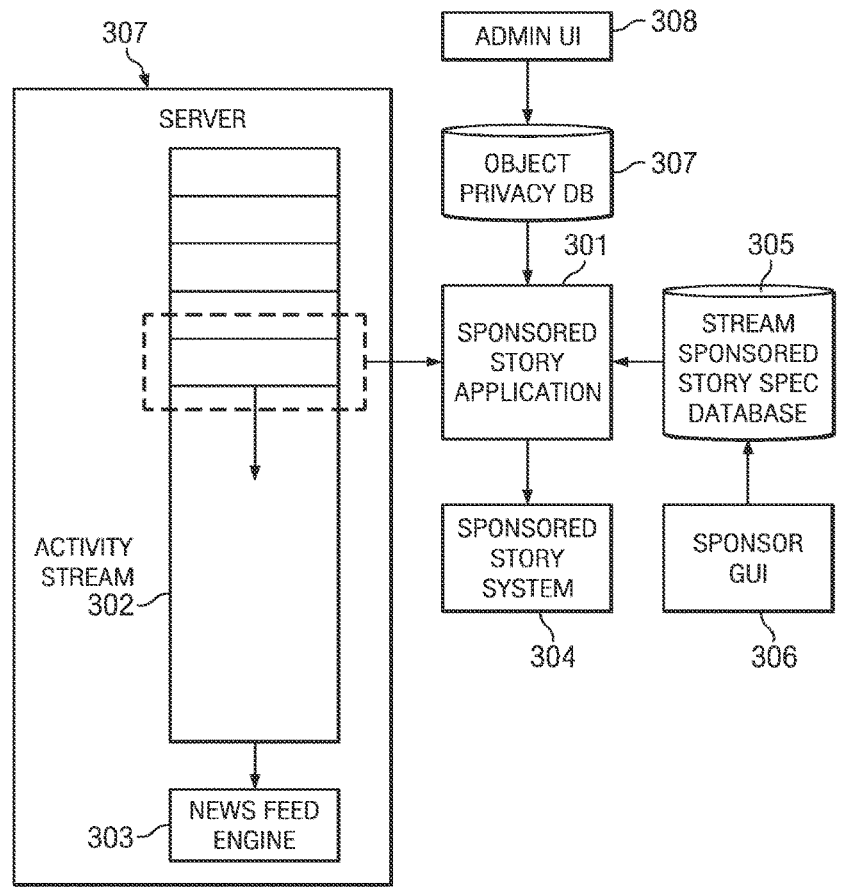
FIG. 3A depicts the interaction between the organic activity stream and the sponsored story specification database to create sponsored stories from newsfeed stories in accordance with one embodiment of the disclosure.

FIG. 3A shows the interaction between sponsored story application 301 and an activity stream 302. In particular embodiments, sponsored story application 301 may be software residing within the sponsored story system 304, or part of the stream sponsored story specification database 305. In particular embodiments, sponsored story application 301 may be software executed by any number of servers in the social networking system, either in conjunction or in isolation. In particular embodiments, sponsored story application 301 may reside on its own dedicated hardware. Activity stream 302 comprises the aggregate stream of status updates and news stories for all users of a social network. Activity stream 302 under normal operation passes to news feed engine 303, which parses the individual stories in activity stream 302 and determines which users' (generally the friends of the user who generated the story) pages to display each story on. In particular embodiments, both activity stream 302 and newsfeed engine 303 are applications residing in server 307. In particular embodiments, activity stream 302 or newsfeed engine 303 are applications distributed across one or more computing servers. This disclosure contemplates any suitable implementation of activity stream 302 and newsfeed engine 303.

Figure 6:
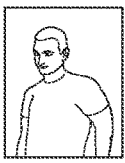
FIG. 6 is an example of the sponsor GUI used by sponsors to specify the type of stories they wish to sponsor or promote to the sponsored story system, in accordance with an embodiment.

A sponsor uses Sponsor GUI 306 to specify the type of stories it wants promoted to the sponsored story section of users' pages. Examples of Sponsor GUI 306 are depicted in FIG. 6. The Sponsor GUI 306 provides a method for the sponsor to create story filters to locate specific types of news feed stories for promoting to the sponsored story space of a user's home page. Once the sponsor sets up its preferences for the types of stories it wishes to promote to the sponsored story portion, the sponsor specifications are stored into stream sponsored story specification database 305.

Any user may sponsor stories for any particular object or node in the social graph. For example, the store "Zappos" may create an object instance for each make/model shoe it sells, and define multiple custom actions that users may perform on the product. For example, Zappos may define shoes that may be "wishlisted", "purchased", "saved to my collection", or any other action Zappos wishes to design in addition to the standard "like" or "share" actions. In particular embodiments, third-party developers may define object instances that may be joined via custom graph actions, for example, a user may assemble an outfit with a collection of multiple object instances as a single story. While Zappos has the option of sponsoring stories generated by users interacting with its objects, object instances, or the node itself (for example, by posting on Zappos's wall), Zappos may not wish to pay for sponsoring such stories. In particular embodiments, a third party wishing to promote its products, such as the manufacturer "Nike", may with to promote stories generated by users acting on Zappos's objects. For example, although Nike has no administrator privileges over Zappos's node, Nike may wish to boost a sponsored story when a user "purchases" a Nike shoe, offered by Zappos, to the purchasing user's friends.

In particular embodiments, sponsored story application 301 first checks in object privacy database 307 to determine the privacy settings of the node/object administrator. For example, certain node administrators may wish to completely opt-out of having sponsored stories generated by actions on their node/objects. In particular embodiments, node administrators may select pre-approved actions that may be boosted as sponsored stories. For example, a third-party may create a "dislike" or "hate" action that may be performed on all nodes, including the node representing Zappos, as a form of consumer advocacy or corporate protest. Zappos may specify that only "liked" or "purchased" actions may be promoted as sponsored stories. In particular embodiments, node administrators may utilize an administrator user interface 308 to define the privacy settings of a node, object, or object instance. In particular embodiments, a node administrator may independently define settings for each object or instance. In particular embodiments, a node administrator may define permissions for all its nodes/objects/instances globally. In particular embodiments, node administrators may have a default sponsored story permission setting that is automatically applied to all its nodes/objects/instances. This disclosure contemplates any suitable method of managing sponsored story permissioning.

Figure 3B:
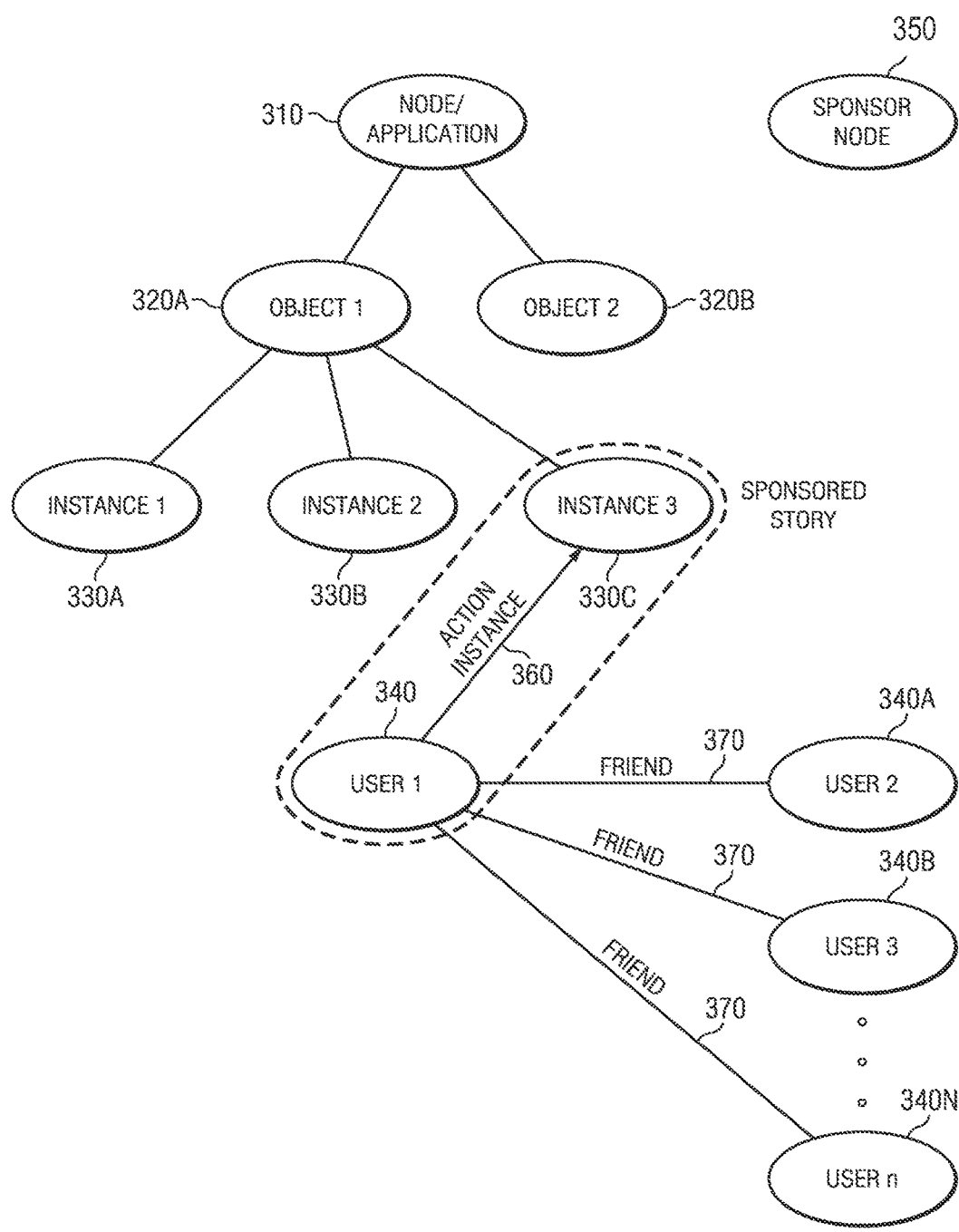
FIG. 3B is an example portion of a social graph.

FIG. 3B illustrates an example portion of a social graph. For didactic purposes, only nodes and edges relevant to an example sponsored story use case are displayed in FIG. 3B. The social graph of FIG. 3B includes a node or application 310. In particular embodiments, node 310 may be a concept node for a particular business, brand, company, location, sports player, or the like. In particular embodiments, node 310 may be an application hosted by the social networking system. In particular embodiments, the application may have a unique namespace and application ID. In particular embodiments, each concept node or application includes its own profile page, also called a "hub page" or "canvas page" that node administrators may edit and post content to, and that users may interact with.

Node 310 includes objects 320A and B. Objects may be defined by the administrator of node 310. For example, node 310 may be a concept node for the store "Zappos", and object nodes 320A and 320B may be object types, such as "shoes" and "socks." In particular embodiments, object 320B may be a particular product, such as "Nike Air Zoom Kobe IV." In particular embodiments, individual products may be represented on the social graph as object instances 330A-C. In particular embodiments, any degree of hierarchical levels may represent a single product. For example, the product "Nike Air Zoom Kobe IV" may be represented, in particular embodiments, hierarchically or categorically, for didactic purposes, with the uppermost nodal level representing the object type "shoes", followed by the category "men's", followed by the manufacturer "Nike", followed by "Air Zoom Kobe IV." The degree of granularity per hierarchical level may be decided by the node administrator. This disclosure contemplates any suitable method of hierarchically representing products, services, articles, or any other object, in the social graph.

In FIG. 3B, object 320A includes three object instances 330A, 330B, and 330C. As previously discussed, an object instance may be any singular, uniquely referenced item defined by the node administrator. For example, object instances 330A-C may be particular shoes, cars, running paths, articles, menu items, or the like. Continuing with the Zappos example above, assume instance 330C is the specific shoe, "Nike Air Zoom Kobe IV."

User 340 interacts with object instance 330C by some action on or off the social networking system. For example, the user may "like" or "share" the shoe by clicking the "like" or "share" buttons on a product page. As previously discussed, the product page need not be hosted on the social networking system, they only need to have the correct social networking API calls embedded in the markup language for the product page. Hence, the product page may reside on the Zappos.com domain, yet communicate social actions to the social networking system via the social networking API. As described above, actions may be of any type and defined by the node administrator. After user 340 performs the action on instance 330C, the two nodes are connected via an action edge 360 in the social graph. In particular embodiments, actions may be custom defined by a node administrator. A custom action have an action definition and individual instances of that action between an individual user and an object.

Sponsor node 350 may be completely separate and independent from concept node or application 310. For example, sponsor node 350 in FIG. 3B may be Nike, and may additionally wish to sponsor stories of user interactions with its brand or shoes to the interacting user's friends 340A-N. Thus, in the example of FIG. 3B, when user 340 interacts with the "Nike Air Zoom Kobe IV" by, for didactic purposes, clicking the "purchase" social networking button on Zappos.com, the social networking system generates a newsfeed story for the action (depicted by the dashed line in FIG. 3B), and Nike may pay for the boosting of the newsfeed story to the right-hand column of the friends 340A-N of user 340.

Figure 4A:
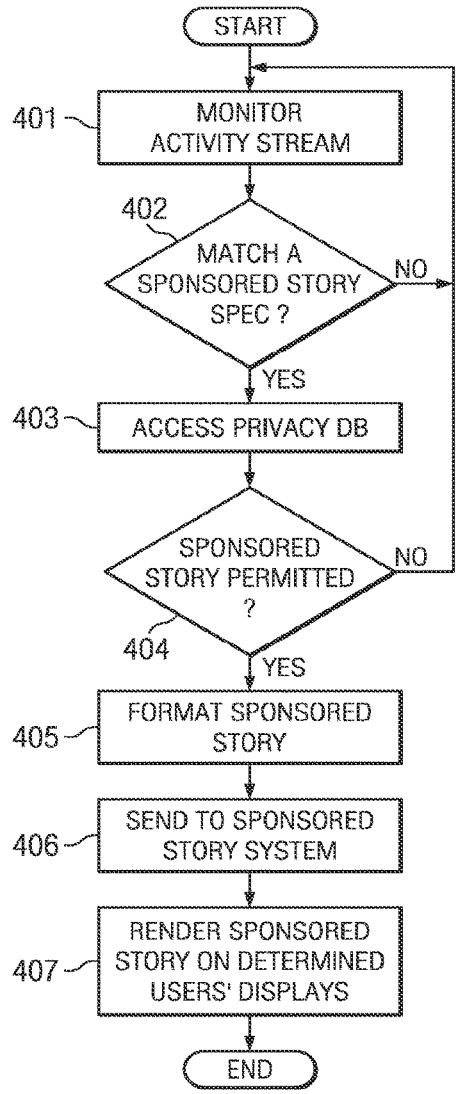
FIG. 4A illustrates a method for promoting stream stories to an sponsored story space.

FIG. 4A depicts the overall flow of one embodiment of the sponsored story system and method. The method of FIG. 4A performs the permission check on the back-end of the process, after receiving the sponsored story specification from the sponsor. Such an embodiment requires more processing by the sponsored story application 301, but will more rapidly reflect changes in node owner permissioning.

In step 401, sponsored story application 301 constantly monitors activity stream 302, searching for matches to any of the sponsored story specifications in stream sponsored story specification database 305. In step 402, the sponsored story system compares each story in the activity stream 302 to all stream sponsored story specifications in stream sponsored story specification database, If there is a match, the procedure continues to step 403, if not, it loops back to 401.

In step 403, upon finding a match, sponsored story application 301 accesses object privacy database 307 for the node owner. In particular embodiments, each object, object instance, or node has a different set of privacy settings. In particular embodiments, all nodes, objects, and object instances have the same privacy settings. In particular embodiments, the sponsored story privacy/permissions settings have three general settings. First, the most restrictive setting may be a complete opt-out of all sponsored stories for the nodes and objects the administrator "owns" (has admin rights to). Thus sponsored story system cannot publish stories generated by actions on nodes having the complete opt-out permission In particular embodiments, these stories are still published to the interacting user's and his or her friends' newsfeed, but cannot be published to an ad space, right-hand column, or any other portion of the social networking website as a sponsored story.

In particular embodiments, the second permission level permits sponsored stories to be generated from actions on nodes or objects, but only for a predetermined set of action types. For example, a particular node administrator may wish to permit sponsored stories, but only for "likes", "purchases," "fan" and other positive actions. For example, a third-party developer may add custom actions to the node or object with negative connotations, such as a "hate" or "dislike", button, that a node administrator may not want to be widely disseminated. As another example, particular actions may contain private information that users may not wish to have publicly boosted, such as when a user makes a reservation to a restaurant. Thus, the node owner is able to control what information and social actions are widely disseminated about its brand, stores, or the like, even if another entity is paying for the sponsoring of newsfeed stories.

In particular embodiments, the third and most liberal permission setting is a completely open setting. In such embodiments, stories generated by users interacting with nodes, objects, or object instances may be boosted as sponsored stories regardless of the type of action generating the story. For example, stories generated by custom actions defined by third parties who lack administrative privileges to the node or object may still be boosted.

At Step 404, sponsored story application 301 determines whether the object/action pair is permitted by the node administrator to be sponsored. If not, the story entry is discarded, and the process returns to monitoring activity stream 302.

In step 405, upon finding a match and determining that the node administrator permits the boosting of the entry, sponsored story application 301 pulls the matching entry out of activity stream 302, and formats the entry into a predetermined visual specification. In particular embodiments, the visual specification is dictated by the social networking system to mimic a regular news feed story. In other embodiments, special identifiers may be added by the social networking system to indicate that the story is a sponsored story. In other embodiments, the visual specifications are entered by the sponsor through the Sponsor GUI 306 at the time of stream story specification. In such an embodiment, the visual specification is stored along with the story specification in the stream sponsored story specification database 305. In particular embodiments, the sponsor is given limited discretion as to the visual specifications for the promoted stream story, subject to predetermined constraints imposed by the social networking system.

In step 406, after the story is formatted pursuant to the visual specification or by the social networking system to visually comport with a news feed story, the sponsored story is passed to sponsored story system 304.

In step 407, after a social story is formatted into a sponsored story, it is priced and directed toward users in a similar manner as a social ad. In particular embodiments, the user may also add a weight to the story to alter its direction toward users. For example, certain stories may decay quickly, such as check-ins, and are not displayed to other users beyond a predetermined threshold time period from the story generation. In other embodiments, user-specified temporal factors, such as deadlines, may increase the weight of the sponsored story so that it is promoted over other sponsored stories lacking time sensitivity.

In particular embodiments, ad targeting is based upon an affinity score calculated by social networking website 100. A member may have affinities for other members, types of actions, types of objects, and content. Accordingly, a calculated affinity score may be based on a weighted function that takes into account the set of affinities for the particular member for each type of data field that is in a candidate story. The website may obtain a member's affinities based on the member's express interests (whether provided directly or indirectly, for example, through, communications with other members) and/or impliedly based on the member's actions (e.g., a member's checking of another member's page indicates an interest in that other member, or clicking on particular types of links may indicate an interest in similar links). An affinity, as measured for example by an affinity score, need not be an actual subjective interest or lack of interest that a member has for something (i.e., the member likes punk rock music, and dislikes vegetarian restaurants), but rather it may merely be a correlation between something in the candidate story and some information stored in connection with that member, whether is an action taken by the member, a communication involving the member, a characteristic, feature or expressed interest in the member's profile.

Figure 4B:
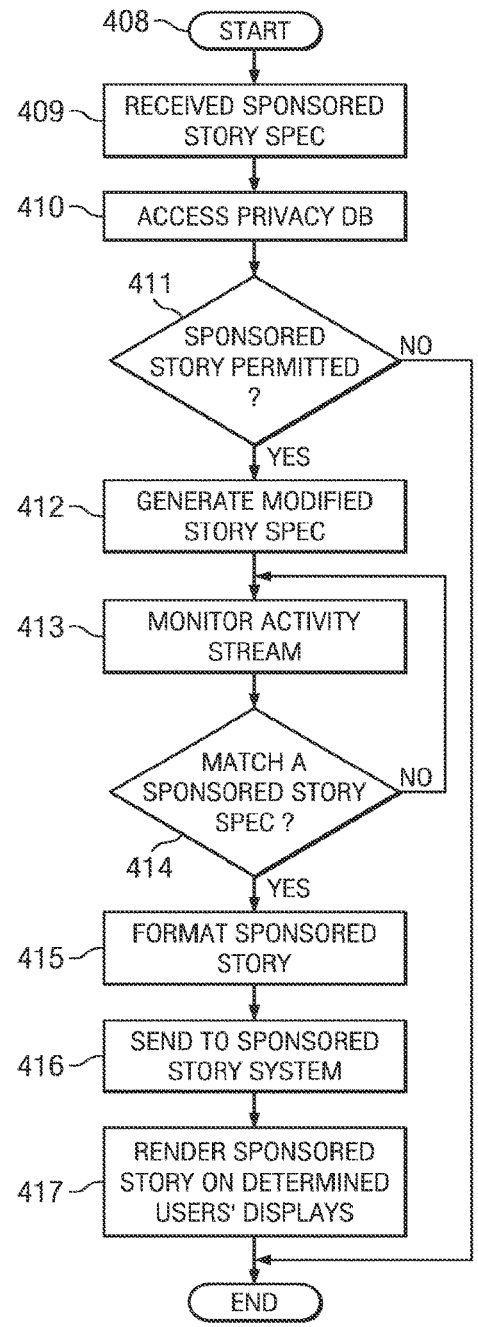
FIG. 4B illustrates an alternative method for promoting stream stories to a sponsored story space.

FIG. 4B illustrates an alternative method of implementing a particular embodiment. The method of FIG. 4B performs the privacy check upon receiving the sponsored story specification via a sponsor using sponsor GUI 306, thereby obviating the need to perform a privacy check for every detected story matching a sponsored story specification in stream sponsored story specification database 305. Thus, the method of FIG. 3A is more easily integrated with an existing sponsored story application 301 that assumes all story specifications are eligible for boosting. However, the method of 3A does not quickly reflect changes in the node or object administrator's privacy or permission settings.

At Step 409, the social networking system receives a sponsored story specification via a sponsor user utilizing sponsor GUI 306. The operation of sponsor GUI 306 is described in greater detail in FIG. 6. The sponsored story specification is subsequently stored in story specification database 305.

At Step 410, sponsored story application 301 accesses object privacy database 307, and determines whether the privacy settings for the node, objects, and actions match the specifications in the sponsored story specification. In particular embodiments, sponsored story application 301 checks each object instance-action pair in the sponsored story specification against the allowed actions and object instances in the permissions for the node or object. For example, if the sponsored story specification requests to boost all stories on Zappos's object instances for the "purchase" and "wishlist" actions, sponsored story specification 301 may first determine which of the three permission settings the administrator of Zappos's node has selected; and if it is the second setting as described above, check each instance-action pair against the approved instances and actions.

If the administrator has selected the most restricted setting, or if none of the actions in the sponsored story specification are permitted by the node administrator, the process terminates and the sponsored story specification is rejected. In particular embodiments, sponsored story application 301 presents a dialog box to the user indicating that the selected objects or actions are not permitted for sponsoring In particular embodiments, steps 410 and 409 occur simultaneously, and sponsored story application 301 greys out unpermitted objects or actions on sponsor GUI 306. This disclosure contemplates any suitable method of limiting requested objects, instances, or actions and informing the sponsoring user of the limitation.

In particular embodiments, at Step 412, sponsored story application 301 generates a modified sponsored story specification containing only the object/action pairs that are permitted for boosting by the node administrator. In particular embodiments, this specification is stored in stream story specification database 305, and the original story specification is stored in a separate storage area that is not searched by sponsored story application 301. In particular embodiments, the modified sponsored story specification replaces the original specification.

In step 413, sponsored story application 301 constantly monitors activity stream 302, searching for matches to any of the sponsored story specifications in stream sponsored story specification database 305. In step 414, the sponsored story system compares each story in the activity stream 302 to all stream sponsored story specifications in stream sponsored story specification database. If there is a match, the procedure continues to step 415, if not, it loops back to 413.

In step 415, upon finding a match, sponsored story application 301 pulls the matching entry out of activity stream 302, and formats the entry into a predetermined visual specification. In particular embodiments, the visual specification is dictated by the social networking system to mimic a regular news feed story. In other embodiments, special identifiers may be added by the social networking system to indicate that the story is a sponsored story. In other embodiments, the visual specifications are entered by the sponsor through the Sponsor GUI 306 at the time of stream story specification. In such an embodiment, the visual specification is stored along with the story specification in the stream sponsored story specification database 305. In particular embodiments, the sponsor is given limited discretion as to the visual specifications for the promoted stream story, subject to predetermined constraints imposed by the social networking system.

In step 416, after the story is formatted pursuant to the visual specification or by the social networking system to visually comport with a news feed story, the sponsored story is passed to sponsored story system 304. In step 417, after a social story is formatted into a sponsored story, it is priced and directed toward users in a similar manner as a social ad, as previously described above.

In particular embodiments, sponsored story system. 304 periodically invalidates sponsored stories. For example, if the underlying story entry, such as a wall post, action, comment, or the like, is deleted, sponsored story system 304 also deletes the generated sponsored story. In particular embodiments, sponsored story system 304 checks, for each sponsored story, whether there have been changes to the underlying story at predetermined intervals, such as once a day. In particular embodiments, any changes in object privacy db 305 triggers sponsored story system 304 to perform a check of existing sponsored stories against the node's new privacy settings. In particular embodiments, individual users may opt-out of the sponsored story service such that none of their social actions may be utilized as sponsored stories, whether sponsored by the administrator of the node or an unaffiliated third party. In particular embodiments, alterations in the user's privacy settings triggers sponsored story system 304 to check existing sponsored stories against the user's new privacy settings.

FIG. 4C illustrates the method of FIGS. 4A and 4B into three distinct phases triggered by three different actions. Sponsored story specification creation 418 phase covers the design and input of a sponsored specification. A user may utilize sponsor GUI 306 to save a sponsored story specification 421 to stream sponsored story specification database 305. Sponsored story specification 421 may have a unique ID, in this case, 18914, and designate both a node (or hub/canvas page), in this case, the node identified by the value 993, as well as a particular action on that node that the user would like to promote. In this case, the action is a "like" action.

Action story creation phase 419 is triggered when another user performs an action on a node that matches the action and node specified in sponsored story specification 421, In this example, user 456 clicks the "like" button on a node 993's hub or canvas page. The particular instance 422 of the "like" action" is generated and transmitted to sponsored story application 301. Sponsored story application the generates a sponsored story 423. In addition to the action instance 422, sponsored story application 301 includes a header, including the unique identifier for the sponsored story specification 421 action instance 422 matches, as well as a trailer identifying user 456.

Delivery phase 420 is triggered when sponsored story system 304 receives sponsored story 423. During this phase, sponsored story system 304 distributes sponsored story 423 to the friends of user 456. In particular embodiments, privacy verification, or determining whether a particular node permits sponsored stories on its objects and for particular actions, occurs during specification creation phase 418 as in FIG. 4B. In particular embodiments, privacy verification occurs during delivery phase 420.

Figure 5:
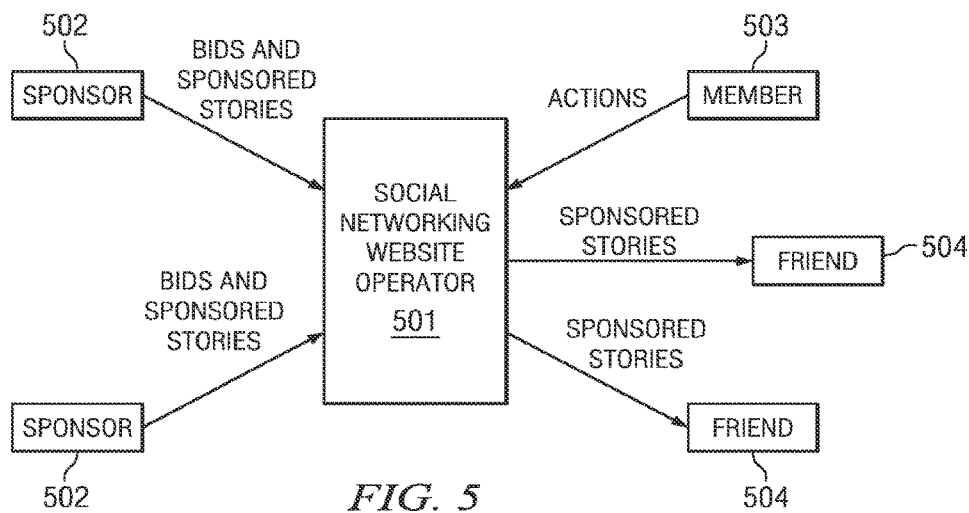
FIG. 5 depicts example components in a sponsored story system in a social network.

FIG. 5 illustrates an event diagram for a sponsored story model in accordance with one embodiment. In this sponsored story model, a number of sponsors 502 bid for the placement of sponsored stories on a social networking website 100. A social networking website operator 501 receives these bids, for example, through a web interface accessible to sponsors 502. Accompanying each bid is a description of the sponsored story that sponsor 502 would like to publish to for display to a particular set of members of the social network. This disclosure contemplates a variety of methods of publishing the sponsored story. In particular embodiments, the sponsored story is published on a social network member's home page on the social network. In particular embodiments, the sponsored story may be displayed on a predetermined area of a mobile device. In particular embodiments, the sponsored story may be published through notifications in the social network. In particular embodiments, the sponsored story may be published through e-mail, instant messaging, or other messaging applications. In particular embodiments, the sponsored story may be displayed on a third-party website integrated with the social network. The web interface may thus allow sponsor 502 to specify all of the relevant information for a sponsored story request, including the bid amount for the sponsored story.

The bid amount specified in the sponsored story request may indicate an amount of money that sponsor 502 will pay for each time a member presented with the sponsored story clicks on it. In one embodiment, the sponsor may be a non-profit or charity where the bid amount is given at little or no cost. Alternatively, the bid amount may specify an amount that sponsor 502 will pay the website operator 501 each time the sponsored story is displayed to a member or a certain number of members or each time the sponsored story is clicked on by a member or a certain number of members. In another embodiment, the sponsor may pay a set amount per month or period of time and the social networking website will determine the bid amount and/or how and when to display the sponsored stories. In addition, the sponsored story request may allow sponsor 502 to specify targeting criteria. This targeting criteria may be a filter to apply to fields of a member's member profile or other object, and/or it may include free form text such as wall posts, comments, and messages. In one embodiment, in order to optimize the targeting and selection of sponsored stories for users of a social network, social information gathered on and off the social network about a user is leveraged to infer interests about users of the social network. Targeting may be based one or more factors such as member demographics, (age, gender, location, birthdate, age, education level, employers, employment type, work history and experience, hobbies, and or preferences. These factors may draw from explicit member statements such as listing it on their profile, connections to other members or entities, or through user-entered text on and off the social networking site. In another embodiment, these factors may be implicitly or inferred by the social network.

One or more sponsored stories available to the social network may contain targeting criteria for determining whether the sponsored story should be targeted to a particular user. While the social network may have sufficient information about some of its users to apply the targeting criteria, the social network may not have sufficient information about other users to apply the targeting criteria. Rather than missing out on the opportunity to target sponsored stories to this latter group of users, embodiments use the information for other users to whom a particular user is connected when the social network does not have sufficient information to apply the targeting criteria to the user. This may be thought of as "inferential" targeting because a user's likely interest in a particular ad is inferred based on whether that user's connections (e.g., friends in the social network) are good candidates for the sponsored story based on its targeting criteria.

FIG. 6 depicts an example of sponsor GUI 601. Sponsor GUI 601 is a simple user interface for allowing a sponsoring user to promote particular stories generated on an object. In particular embodiments, sponsor GUI 601 includes a target node bar 602. Target node bar prompts the user of sponsor GUI 601 what node, object, or instance they are trying to promote. In particular embodiments, the user may type in target node bar 602 and search for any node of their choosing. In particular embodiments, sponsor GUI 601 utilizes a typeahead feature to deliver search results in real-time. Once the desired node, object, or object instance is selected, the sponsor target 603 appears in sponsor GUI 601. In this example, the target is a hub page for the node representing "Roger Federer."

In particular embodiments, sponsor GUI 601 allows a sponsoring user to select between sponsored stories, generated by user actions on sponsor target 603, and static social networking ads, which are generated by the sponsor itself. In particular embodiments, for ease of use, predefined sponsored story types 605 may be easily selectable in sponsor GUI 601. As an example, sponsor GUI 601 may provide the most commonly used action types, such as page like stories, sponsored page posts, and "likes" on page posts. Alternatively, sponsor GUI 601 may allow a sponsoring user to utilize a query-based specification, where the sponsoring user has greater control over the actions he or she wishes to sponsor for the sponsor target.

Selectable buttons 606 allow the user to select multiple different actions for promoting in a sponsored story. For example, a user may select any or all of the various combinations of actions in 606, including but not limited to "likes" on the hub page for Roger Federer, posts by users on the wall of the hub page for Roger Federer, or when users "like" posts on the page of Roger Federer.

In particular embodiments, the user utilizing sponsor GUI 601 may wish to sponsor actions on sponsor target 603 that are not explicitly listed in sponsor GUI 601. In such a case, the user of sponsor GUI 601 may manually enter in the specific actions in text box 607 he or she wishes to promote. In particular embodiments, the object ID is automatically filled in text box 607 based on sponsor target 603 identified in target node bar 602. In particular embodiments, text box 607 may include a drop down list of all actions on the social networking system that may be taken on sponsor target 603. In particular embodiments, the user may search for specific actions using a typeahead process similar to the one utilized in target node bar 602. This disclosure contemplates any suitable method of identifying actions on a specific node, object, r object instance for promoting as a sponsored story.

Figure 7:
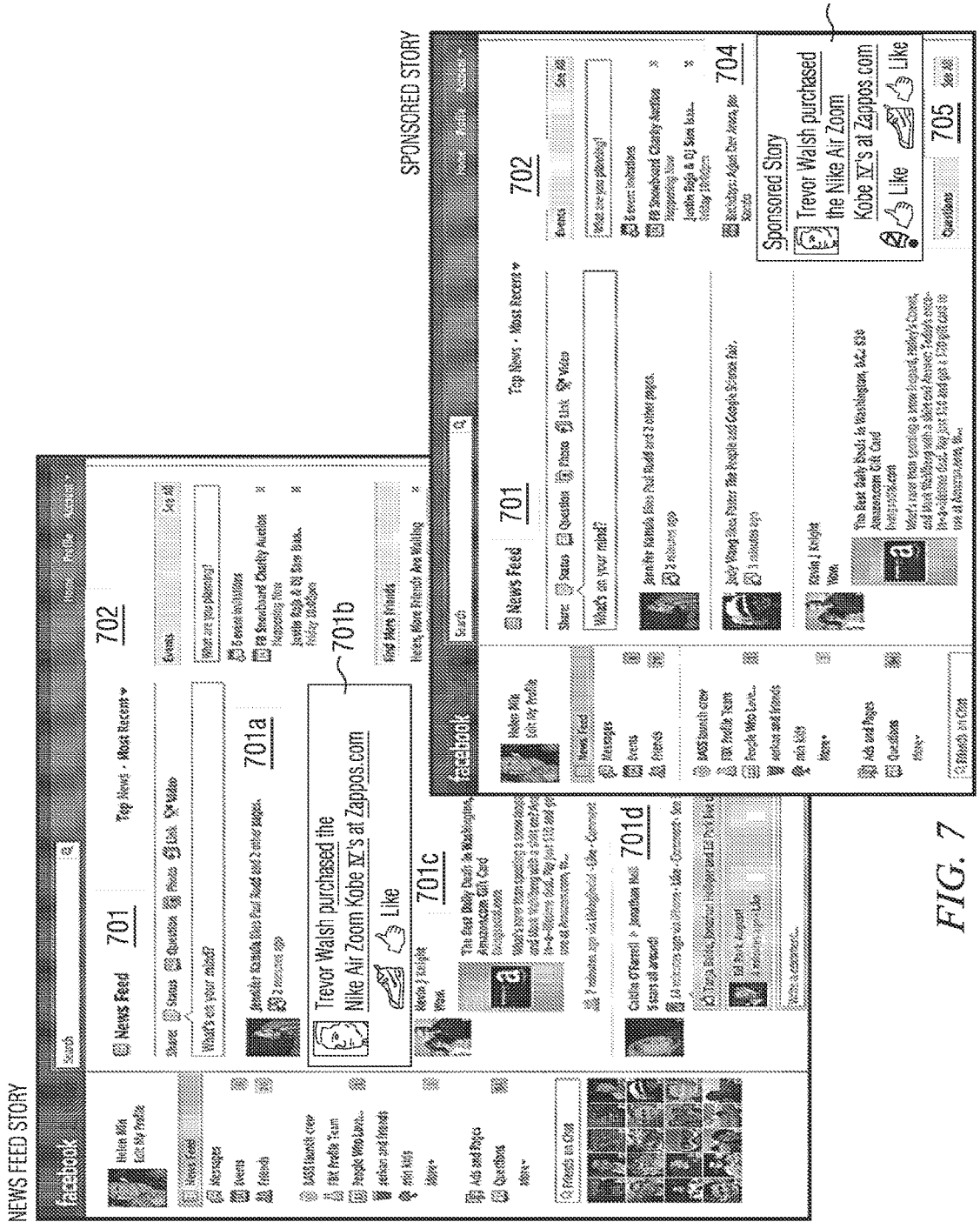
FIG. 7 is an example of a news feed story promoted to the sponsored story space of a user's social networking homepage in accordance with one embodiment of the disclosure.
Figure 7A:
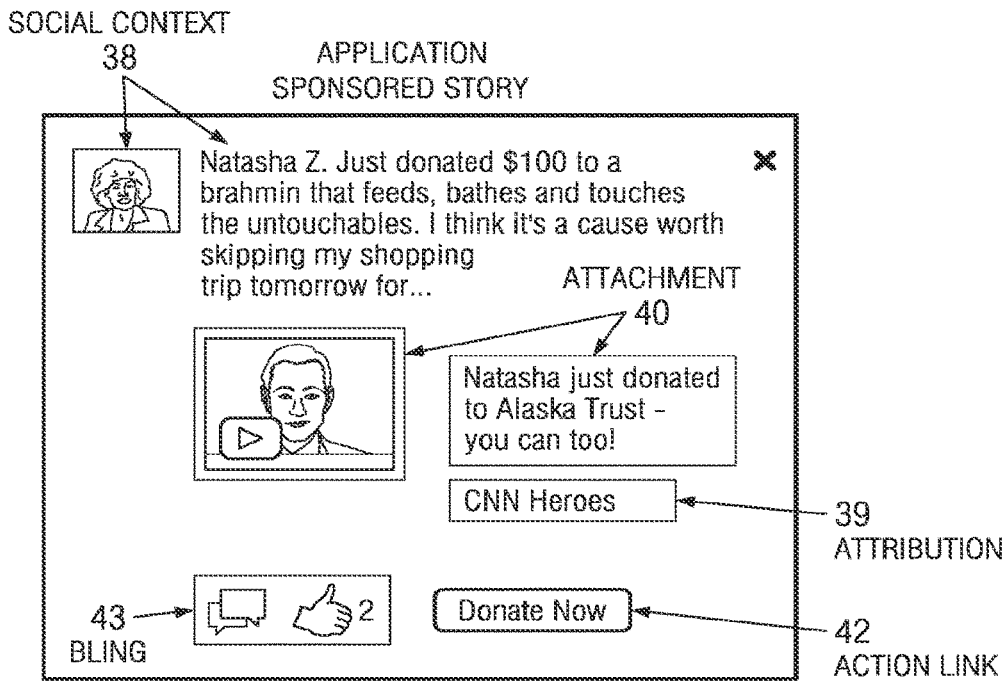
FIGS. 7A-E illustrate examples of various types of sponsored stories.
Figure 7B:
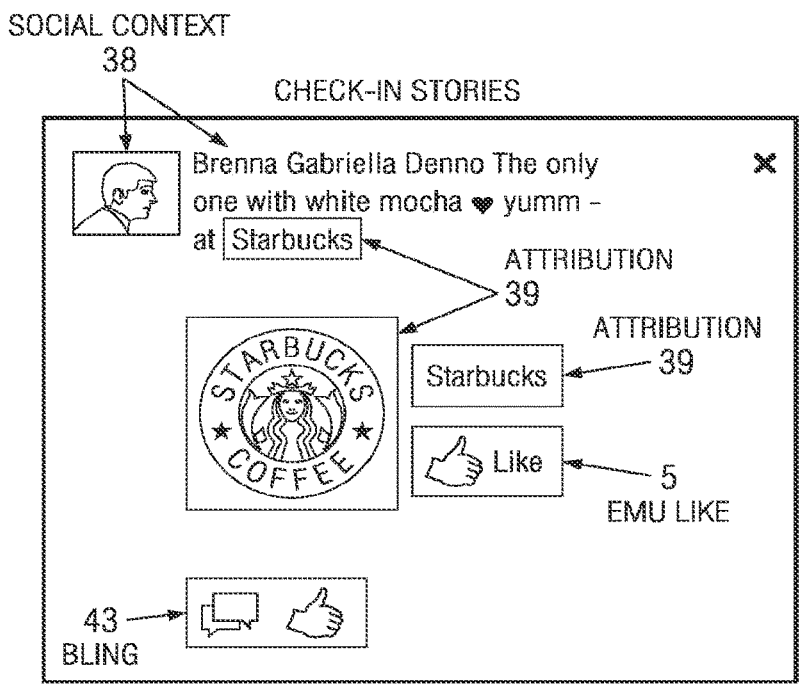

In FIG. 7, a user's newsfeed 701, recommendation space 702, sponsored story space 703, notifications 704, and questions 707 are depicted. In particular embodiments, elements 701-705 are displayed on a social networking user's home screen. In particular embodiments, element 701 is displayed on a user's home screen, and one or more of elements 702-705 are displayed at all times. This disclosure contemplates any arrangement of elements 701-705 and any degree of persistence. In particular embodiments, elements 702-705 are displayed on other user's pages. In particular embodiments, these other users may be the user's friend. In other embodiments, these other users may be otherwise associated with the user. In particular embodiments, the display of elements to other users 702-705 is determined by sponsored story system 304. The sponsored story system 304 accesses a database of user privacy preferences when determining which users to display the sponsored story to. For example, if a user has previously specified that he or she does not wish to see sponsored stories from a particular company, the sponsored story system will not display stories promoted by that particular company. In particular embodiments, sponsored story system 304 accesses the visibility and privacy settings of the user that generated the newsfeed story to be promoted, and uses the settings in determining which users to display the promoted story to. For example, a user may have multiple friend lists, and members belonging to one or more different lists may be prevented from viewing specific stories, types of stories, or the user's newsfeed altogether. sponsored story system 304 respects these settings so that only friends of the user who are granted access to view the newsfeed story to be promoted are displayed the promoted stream sponsored story. This disclosure contemplates various methods of determining which users to display element 703 to as envisioned by those of ordinary skill in the art. Newsfeed 701 includes newsfeed stories 701a-701d. These stories are generated specifically for a user based upon the activities the user's friends or other entities the user is associated with Newsfeed story 701b is an example of a newsfeed story that has been selected for promoting to sponsor space 703. When the sponsored story application 301 detects a match in the activity stream 302 to an sponsor's stream sponsored story specification from the stream sponsored story specification database 303, the sponsored story 703 is formatted to resemble a news feed story and sent to the sponsored story system 304. In this particular example, the stream story relates to a story when a friend of the user purchased the "Nike Air Zoom Kobe IV" shoes from Zappos.com. The formatted sponsored story 703 is promoted to the user or another set of users by the sponsored story system 304.

Figure 7C:
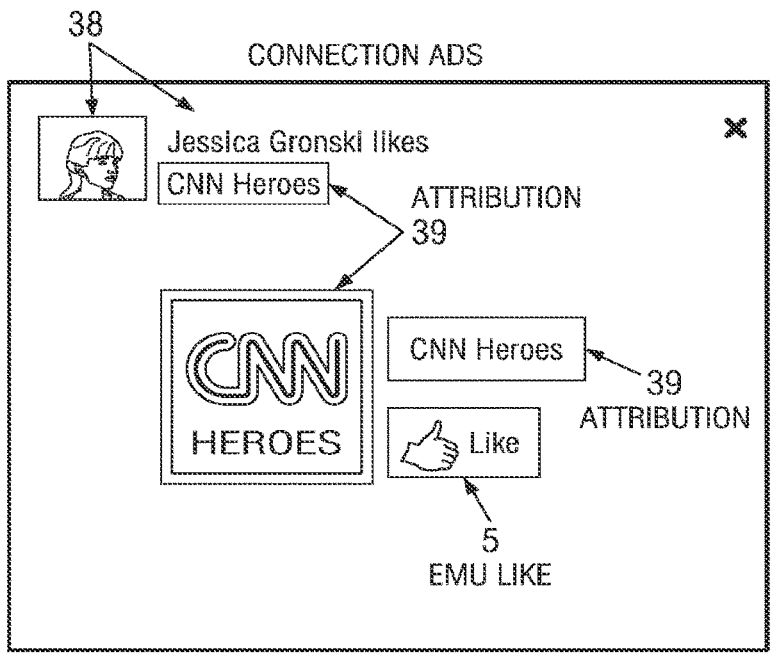
Figure 7D:
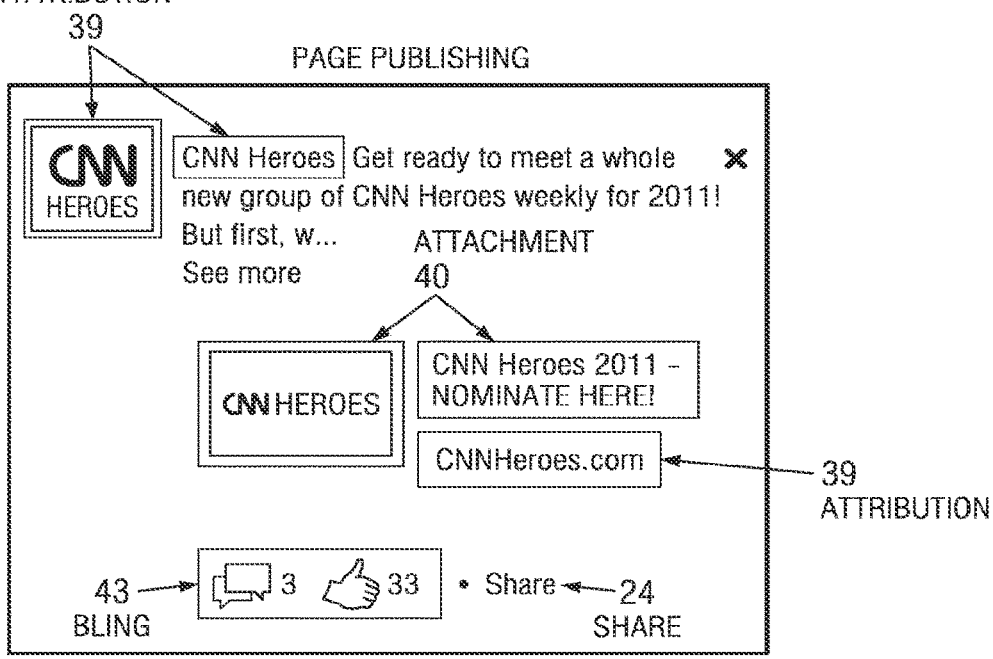
Figure 7E:
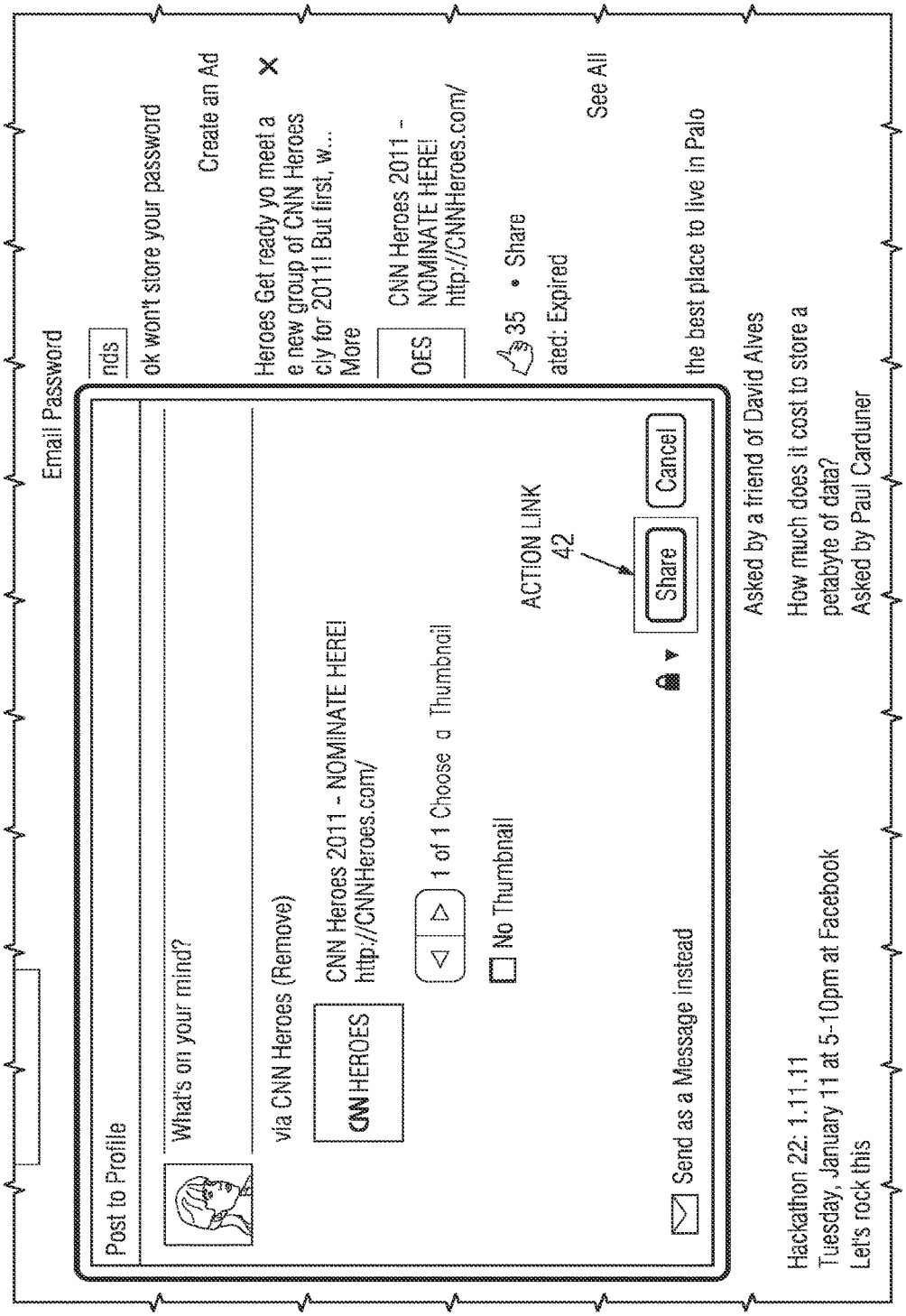

FIGS. 7A-E illustrate examples of promoted sponsor stories 703. Each Sponsored Story 703 includes a social context 38. In particular embodiments, social context 38 comprises the user who performed the social action, a descriptor of the action, and a comment entered by the user who performed the social action. Sponsored stories 703 may also include an attribution 39, corresponding to the entity selected by the sponsor in, sponsor GUI 306. In particular embodiments, the attribution is the node with which the user interacted or connected with to generate the stream story. For example, in FIG. 7B, the user interacted with the entity "Starbucks" by checking-in to a Starbucks location. In FIG. 7C, user interacted with the entity or node "CNN Heroes" by "liking" the entity. Sponsored stories 703 may also include a bling indicator 43, which provides a visual indication as to how many members of the social networking site have commented or liked the sponsored story. Emu like interface 6 allows users to quickly interact with the node/entity by "liking" it. In particular embodiments, sponsored story 703 may include an action link 42, which allows a user, when selecting the link, to quickly perform a predetermined action, such as, in FIG. 7A, donating to a particular cause. FIG. 7D depicts an example where an share link 24 to share a story published by an entity or node, in this case "CNN Heroes," is provided. Upon clicking share link 24, the user is taken to an interface depicted in FIG. 7E, which allows the user to publish the sponsored story back to his or her own news feed. Action link 42 in FIG. 7E posts the sponsored story to the user's own wall along with any comments the user optionally chooses to append to the story. The embodiments depicted in FIGS. 7A-7E are merely examples and are in no way limiting; this disclosure contemplates any number of formatting and actions for sponsored stories.

Figure 8:
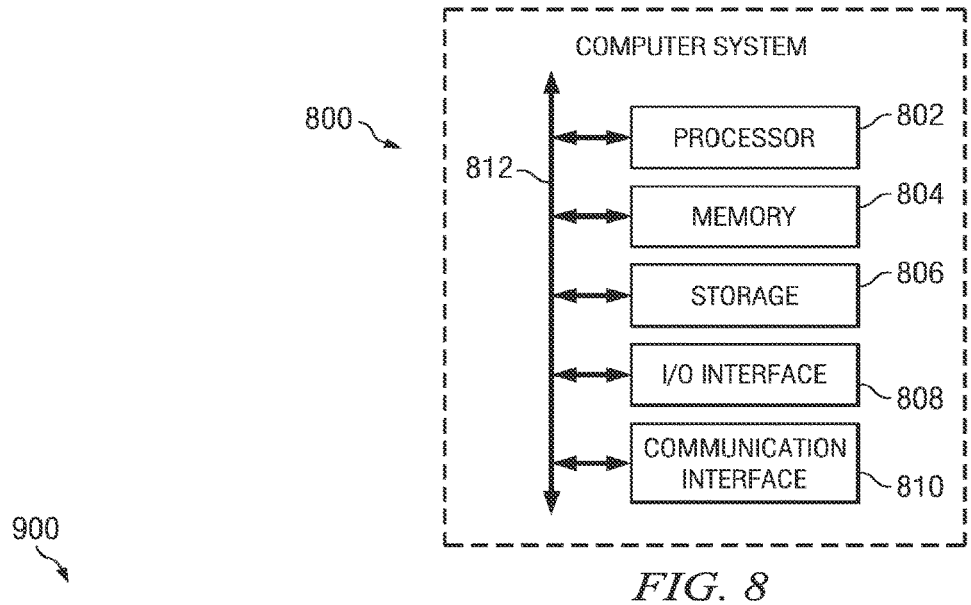
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple datacenters; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 02 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is nonvolatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, reference to a computer-readable non-transitory storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable non-transitory storage medium, or a suitable combination of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 802 (such as, for example, one or more internal registers or caches), one or more portions of memory 804, one or more portions of storage 806, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Figure 9:
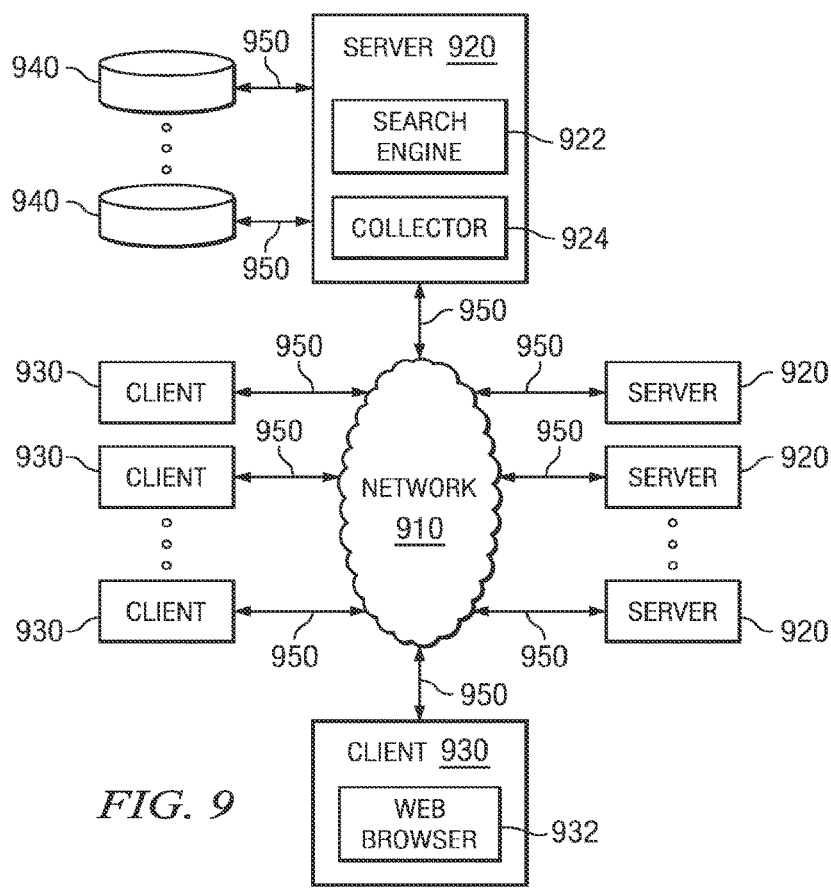
FIG. 9 illustrates an example network environment.

FIG. 9 illustrates an example network environment 900. This disclosure contemplates any suitable network environment 900. As an example and not by way of limitation, although this disclosure describes and illustrates a network environment 900 that implements a client-server model, this disclosure contemplates one or more portions of a network environment 900 being peer-to-peer, where appropriate. Particular embodiments may operate in whole or in part in one or more network environments 900. In particular embodiments, one or more elements of network environment 900 provide functionality described or illustrated herein. Particular embodiments include one or more portions of network environment 900. Network environment 900 includes a network 99 coupling one or more servers 920 and one or more clients 930 to each other. This disclosure contemplates any suitable network 99. As an example and not by way of limitation, one or more portions of network 99 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 99 may include one or more networks 99.

Links 950 couple servers 920 and clients 930 to network 99 or to each other. This disclosure contemplates any suitable links 950. As an example and not by way of limitation, one or more links 950 each include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) links 950. In particular embodiments, one or more links 950 each includes an intranet, an extranet, a VPN, a LAN, a WLAN, a WAN, a MAN, a communications network, a satellite network, a portion of the Internet, or another link 950 or a combination of two or more such links 950. Links 950 need not necessarily be the same throughout network environment 900. One or more first links 950 may differ in one or more respects from one or more second links 950.

This disclosure contemplates any suitable servers 920. As an example and not by way of limitation, one or more servers 920 may each include one or more advertising servers, applications servers, catalog servers, communications servers, database servers, exchange servers, fax servers, file servers, game servers, home servers, mail servers, message servers, news servers, name or DNS servers, print servers, proxy servers, sound servers, standalone servers, web servers, or web-feed servers. In particular embodiments, a server 920 includes hardware, software, or both for providing the functionality of server 920. As an example and not by way of limitation, a server 920 that operates as a web server may be capable of hosting websites containing web pages or elements of web pages and include appropriate hardware, software, or both for doing so. In particular embodiments, a web server may host HTML or other suitable files or dynamically create or constitute files for web pages on request. In response to a Hyper Text Transfer Protocol (HTTP) or other request from a client 930, the web server may communicate one or more such files to client 930. As another example, a server 920 that operates as a mail server may be capable of providing e-mail services to one or more clients 930. As another example, a server 920 that operates as a database server may be capable of providing an interface for interacting with one or more data stores (such as, for example, data stores 940 described below). Where appropriate, a server 920 may include one or more servers 920; be unitary or distributed; span multiple locations; span multiple machines; span multiple datacenters; or reside in a cloud, which may include one or more cloud components in one or more networks.

In particular embodiments, one or more links 950 may couple a server 920 to one or more data stores 940. A data store 940 may store any suitable information, and the contents of a data store 940 may be organized in any suitable manner. As an example and not by way of limitation, the contents of a data store 940 may be stored as a dimensional, flat, hierarchical, network, object-oriented, relational, XML, or other suitable database or a combination or two or more of these. A data store 940 (or a server 920 coupled to it) may include a database-management system or other hardware or software for managing the contents of data store 940. The database-management system may perform read and write operations, delete or erase data, perform data deduplication, query or search the contents of data store 940, or provide other access to data store 940.

In particular embodiments, one or more servers 920 may each include one or more search engines 922. A search engine 922 may include hardware, software, or both for providing the functionality of search engine 922. As an example and not by way of limitation, a search engine 922 may implement one or more search algorithms to identify network resources in response to search queries received at search engine 922, one or more ranking algorithms to rank identified network resources, or one or more summarization algorithms to summarize identified network resources. In particular embodiments, a ranking algorithm implemented by a search engine 922 may use a machine-learned ranking formula, which the ranking algorithm may obtain automatically from a set of training data constructed from pairs of search queries and selected Uniform Resource Locators (URLs), where appropriate.

In particular embodiments, one or more servers 920 may each include one or more data monitors/collectors 924. A data monitor/collection 924 may include hardware software, or both for providing the functionality of data collector/collector 924. As an example and not by way of limitation, a data monitor/collector 924 at a server 920 may monitor and collect network-traffic data at server 920 and store the network-traffic data in one or more data stores 940. In particular embodiments, server 920 or another device may extract pairs of search queries and selected URLs from the network-traffic data, where appropriate.

This disclosure contemplates any suitable clients 930. A client 930 may enable a user at client 930 to access or otherwise communicate with network 99, servers 920, or other clients 930. As an example and not by way of limitation, a client 930 may have a web browser 932, such as MICROSOFT INTERNET EXPLORER or MOZILLA FIREFOX, and may have one or more add-ons, plug-ins, or other extensions, such as GOGGLE TOOLBAR or YAHOO TOOLBAR. A client 930 may be an electronic device including hardware, software, or both for providing the functionality of client 930. As an example and not by way of limitation, a client 930 may, where appropriate, be an embedded computer system, an SOC, an SBC (such as, for example, a COM or SOM), a desktop computer system, a laptop or notebook computer system, an interactive kiosk, a mainframe, a mesh of computer systems, a mobile telephone, a PDA, a netbook computer system, a server, a tablet computer system or a combination of two or more of these. Where appropriate, a client 930 may include one or more clients 930; be unitary or distributed; span multiple locations; span multiple machines; span multiple datacenters; or reside in a cloud, which may include one or more cloud components in one or more networks.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The foregoing description of the embodiments have been presented for the purpose of illustration; it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network system, it will apparent to one of ordinary skill in the art that the invention may be used with any electronic social network service and, even if it is not provided through a website. Any computer-based system that provides social networking functionality can be used in accordance with the present invention even if it relies, for example, on e-mail, instant messaging or other form of peer-to-peer communications, and any other technique for communicating between users. The invention is thus not limited to any particular type of communication system, network, protocol, format or application.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

The present invention has been explained with reference to specific embodiments. For example, while embodiments of the present invention have been described as operating in connection with a social network system, the present invention can be used in connection with any communications facility that allows for communication of messages between users, such as an email hosting site. Other embodiments will be evident to those of ordinary skill in the art. It is therefore not intended that the present invention be limited, except as indicated by the appended claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, comprising:
    receiving sponsor specifications designating a set of story characteristics as criteria for promoting a story displayed to users of an online social networking system as a sponsored story, wherein a story describes an action on an object, the story characteristics comprising a targeted object and targeted one or more action types for an action taken on an object by any user of the online social networking system;
    accessing a database of permissions for the object;
    determining if the object permissions permit sponsored stories to be generated from actions on the object:
    in response to a positive determination:
    generating, by a processor, a set of modified story characteristics based on the permissions;
    monitoring, by the processor, an organic activity stream of stories displayed to users in the online social networking system for one or more stories describing an action on an object by any user matching the targeted object and targeted one or more action types; and
    upon finding a match, promoting the one or more matching stories describing the action on the object by the user to be displayed as one or more sponsored stories to one or more users in the online social networking system in conjunction with the organic activity stream.

2. The method of claim 1, generating the set of modified story characteristics comprising: for each of the one or more actions in the story characteristics:
    determining if the object permissions permit sponsored stories based on the action;
    in response to a positive determination, including the action in the modified story characteristics; and
    in response to a negative determination, excluding the action from the modified story characteristics.

3. The method of claim 1, wherein the set of story characteristics further comprises one or more object instances.

4. The method of claim 3, generating the set of modified story characteristics comprising: for each of the one or more object instances:
    determining if the object permissions permit sponsored stories for the object instance;
    in response to a positive determination, including the instance in the modified story characteristics;
    for each of the one or more actions in the story characteristics:
    determining if the object permissions permit sponsored stories based on the action;
    in response to a positive determination, including the action/instance pair in the modified story characteristics; and
    in response to a negative determination, excluding the action/instance pair from the modified story characteristics;
    in response to a negative determination, excluding the instance from the modified story characteristics.

5. The method of claim 1, further comprising:
    periodically re-generating the set of modified story characteristics.

6. The method of claim 1, further comprising:
    monitoring the entry for changes in status, and updating the sponsored story to reflect any changes in the entry's status.

7. The method of claim 6, wherein a change in status comprises deletion of the entry, and the sponsored story is deleted to reflect the change.

8. The method of claim 6, wherein a change in status comprises altering the visibility of the entry, and the sponsored story visibility is altered to match the visibility of the entry.

9. A method comprising, by one or more computing systems:
    receiving sponsor specifications designating a set of story characteristics as criteria for promoting a story displayed to users of an online social networking system as a sponsored story, wherein a story describes an action on an object, the story characteristics comprising a targeted object and one or more targeted action types for an action taken on the object by any user of the online social networking system;
    monitoring, by a processor, an organic activity stream of stories displayed to users in the online social networking system for one or more stories describing an action on an object by [ [a]] any user matching the targeted object and targeted one or more action types; and
    upon finding a match, accessing a database of permissions for the object;
    determining if the object permissions permit sponsored stories to be generated from actions on the object; and
    promoting the one or more stories describing an action on an object by the user to be displayed as one or more sponsored stories to one or more users in the online social networking system in conjunction with the organic activity stream.

10. A non-transitory, computer-readable medium comprising instructions operable, when executed by one or more computing systems, to:
    receive sponsor specifications designating a set of story characteristics as criteria for promoting a story displayed to users of an online social networking system as a sponsored story, wherein a story describes an action on an object, the story characteristics comprising a targeted object and one or more targeted action types for an action taken on the object by any user of the online social networking system;
access a database of permissions for the object;
determine if the object permissions permit sponsored stories to be generated from actions on the object;
in response to a positive determination:
generate, by a processor, a set of modified story characteristics based on the permissions;
monitor, by the processor, an organic activity stream of stories displayed to users in the online social networking system for one or more stories describing an action on an object by any user matching the targeted object and one or more targeted action types; and
upon finding a match, promote the one or more stories describing an action on an object by the user to be displayed as one or more sponsored stories to one or more users in the online social networking system in conjunction with the organic activity stream.

11. The computer-readable medium of claim 10, generating the set of modified story characteristics comprising: for each of the one or more actions in the story characteristics:
determining if the object permissions permit sponsored stories based on the action;
in response to a positive determination, including the action in the modified story characteristics; and
in response to a negative determination, excluding the action from the modified story characteristics.

12. The computer-readable medium of claim 10, wherein the set of story characteristics further comprises one or more object instances.

13. The computer-readable medium of claim 12, generating the set of modified story characteristics comprising: for each of the one or more object instances:
determining if the object permissions permit sponsored stories for the object instance;
in response to a positive determination, including the instance in the modified story characteristics;
for each of the one or more actions in the story characteristics:
determining if the object permissions permit sponsored stories based on the action;
in response to a positive determination, including the action/instance pair in the modified story characteristics; and
in response to a negative determination, excluding the action/instance pair from the modified story characteristics;
in response to a negative determination, excluding the instance from the modified story characteristics.

14. The computer-readable medium of claim 10, the instructions further operable, when executed, to:
periodically re-generate the set of modified story characteristics.

15. The computer-readable medium of claim 10, the instructions further operable, when executed, to:
monitor the entry for changes in status, and updating the sponsored story to reflect any changes in the entry's status.

16. The computer-readable medium of claim 15, wherein a change in status comprises deletion of the entry, and the sponsored story is deleted to reflect the change.

17. The computer-readable medium of claim 15, wherein a change in status comprises altering the visibility of the entry, and the sponsored story visibility is altered to match the visibility of the entry.

18. The computer-readable medium of claim 10, wherein the object types and instances may be user-defined.

19. The computer-readable medium of claim 10, wherein the action types may be user-defined.

20. The computer-readable medium of claim 10, wherein the organic activity stream includes actions performed on external systems.

* * * * *

UNITED STATES PATENT AND TRADEMARK OFFICE
CERTIFICATE OF CORRECTION

PATENT NO. : 9,742,822 B2
APPLICATION NO. : 14/792528
DATED : August 22, 2017
INVENTOR(S) : Philip Anastasios Zigoris It is certified that error appears in the above-identified patent and that said Letters Patent is hereby corrected as shown below:

In the Claims

Column 24, Line 48, after "by," delete "[ [a]]".

Signed and Sealed this
Third Day of April, 2018

Andrei Iancu
*Director of the United States Patent and Trademark Office*